US011960243B2

(12) United States Patent
Sasaki et al.

(10) Patent No.: US 11,960,243 B2
(45) Date of Patent: Apr. 16, 2024

(54) ELECTROSTATIC IMAGE DEVELOPER, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Kazutsuna Sasaki, Kanagawa (JP); Yasuo Kadokura, Kanagawa (JP); Takuro Watanabe, Kanagawa (JP); Karin Sakai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 198 days.

(21) Appl. No.: 17/410,557

(22) Filed: Aug. 24, 2021

(65) Prior Publication Data

US 2022/0373921 A1 Nov. 24, 2022

(30) Foreign Application Priority Data

May 20, 2021 (JP) ................................ 2021-085622

(51) Int. Cl.
*G03G 9/113* (2006.01)
*G03G 9/107* (2006.01)

(52) U.S. Cl.
CPC ........... *G03G 9/1088* (2020.08); *G03G 9/113* (2013.01)

(58) Field of Classification Search
CPC .............................................. G03G 9/10–1139
See application file for complete search history.

(56) References Cited

U.S. PATENT DOCUMENTS

| | | | | |
|---|---|---|---|---|
| 4,468,445 A * | 8/1984 | Kelly | G03G 9/1135 430/111.32 |
| 4,500,195 A * | 2/1985 | Hosono | G03G 15/01 399/46 |
| 5,968,699 A * | 10/1999 | Matsuzaki | G03G 9/1133 430/111.41 |
| 2003/0113650 A1* | 6/2003 | Suwabe | G03G 13/08 399/176 |

FOREIGN PATENT DOCUMENTS

JP 2009-69502 A 4/2009

* cited by examiner

*Primary Examiner* — Peter L Vajda
*Assistant Examiner* — Charles Collins Sullivan, IV
(74) *Attorney, Agent, or Firm* — Oliff PLC

(57) ABSTRACT

An electrostatic image developer includes a toner including toner particles that include a binder resin and a release agent and have an exposure ratio of the release agent of 15% or more and 30% or less, and a carrier including magnetic particles and resin cover layers covering the magnetic particles and including inorganic particles, wherein the inorganic particles have an arithmetic average particle size of 5 nm or more and 90 nm or less, the resin cover layers have an average thickness of 0.6 μm or more and 1.4 μm or less, and a fine-irregularity-structure surface roughness of surfaces of the carrier three-dimensionally analyzed has, in an analysis region, a ratio B/A of an irregularity-surface area B to a plan-view area A of 1.020 or more and 1.100 or less.

20 Claims, 2 Drawing Sheets

ELECTROSTATIC IMAGE DEVELOPER, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2021-085622 filed May 20, 2021.

BACKGROUND

(i) Technical Field

The present disclosure relates to an electrostatic image developer, a process cartridge, an image forming apparatus, and an image forming method.

(ii) Related Art

Japanese Unexamined Patent Application Publication No. 2009-069502 discloses a two-component developer composed of a toner and a carrier, wherein the toner includes coloring resin particles that include a hydrocarbon wax having a melting point of 64 to 77° C. and have a volume-average particle size of 4 to 9 μm and an external additive having a number-average particle size of 80 to 300 nm, the carrier includes covered core particles that are constituted by core particles composed of a ferrite component and cover layers disposed on the surfaces of the core particles and formed of a thermosetting straight silicone resin and that have a volume-average particle size of 25 to 60 μm, and, in the covered core particles, an intensity ratio Si/Fe of the intensity of the X-ray from Si to the intensity of the X-ray from Fe measured by X-ray fluorescence analysis is 0.01 or more and 0.03 or less.

SUMMARY

Aspects of non-limiting embodiments of the present disclosure relate to, for an electrostatic image developer including a toner including toner particles having a release-agent exposure ratio of 15% or more and 30% or less and a carrier including magnetic particles and resin cover layers covering the magnetic particles and including inorganic particles wherein the inorganic particles have an average particle size of 5 nm or more and 90 nm or less and the resin cover layers have an average thickness of 0.6 μm or more and 1.4 μm or less, compared with a case where the fine-irregularity-structure surface roughness of the surfaces of the carrier three-dimensionally analyzed has, in an analysis region, a ratio B/A of an irregularity-surface area B to a plan-view area A of less than 1.020 or more than 1.100, providing an electrostatic image developer that suppresses a decrease in the image density caused during continuous formation of images having low area coverage.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic image developer including a toner including toner particles that include a binder resin and a release agent and have an exposure ratio of the release agent of 15% or more and 30% or less, and a carrier including magnetic particles and resin cover layers covering the magnetic particles and including inorganic particles, wherein the inorganic particles have an arithmetic average particle size of 5 nm or more and 90 nm or less, the resin cover layers have an average thickness of 0.6 μm or more and 1.4 μm or less, and a fine-irregularity-structure surface roughness of surfaces of the carrier three-dimensionally analyzed has, in an analysis region, a ratio B/A of an irregularity-surface area B to a plan-view area A of 1.020 or more and 1.100 or less.

BRIEF DESCRIPTION OF THE DRAWINGS

Exemplary embodiments of the present disclosure will be described in detail based on the following figures, wherein.

DETAILED DESCRIPTION

Figure 1:
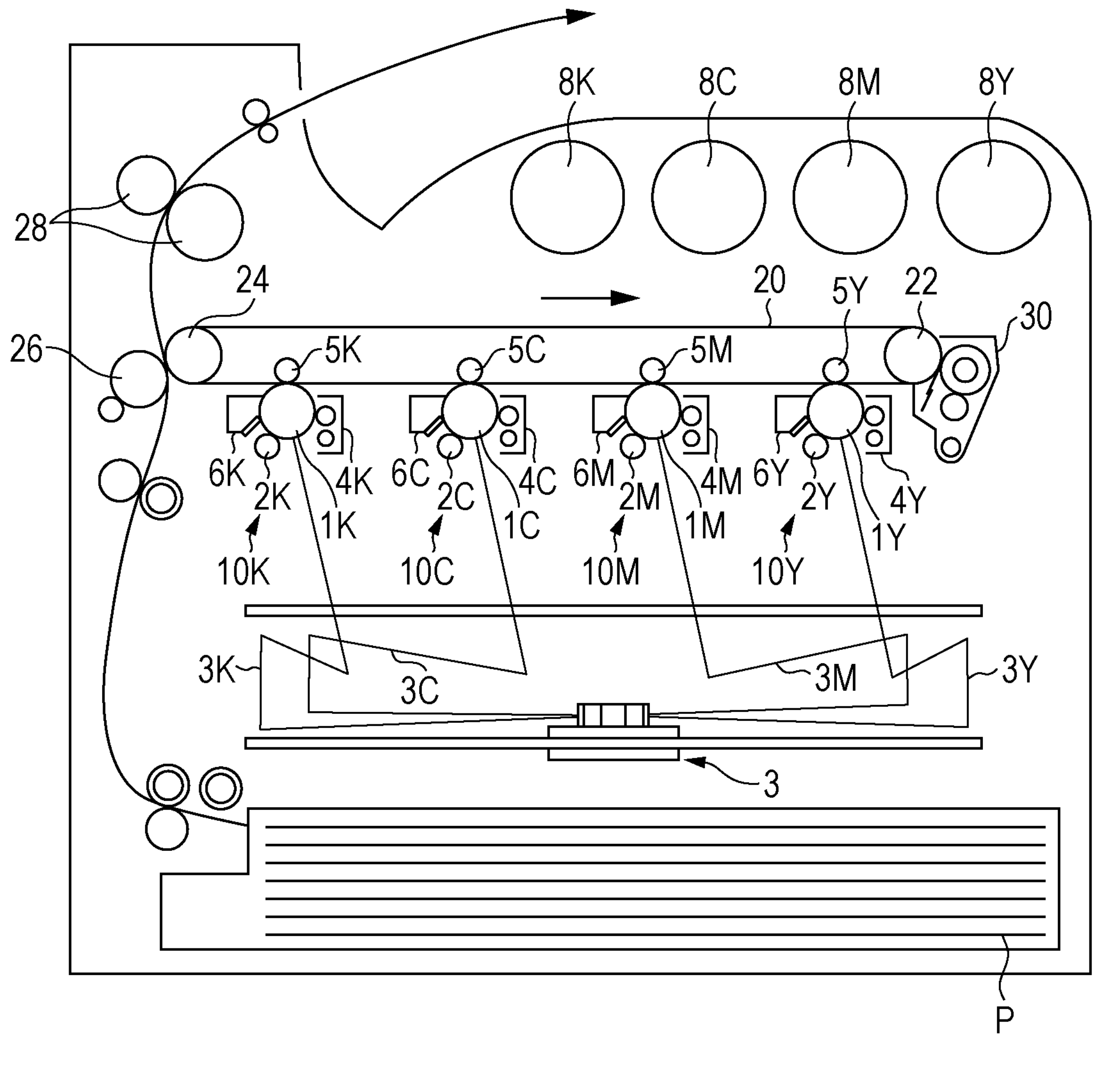
FIG. 1 is a schematic configuration view illustrating an example of an image forming apparatus according to the present exemplary embodiment.

Hereinafter, exemplary embodiments according to the present disclosure will be described. These descriptions and Examples are examples of exemplary embodiments and do not limit the scope of exemplary embodiments.

In the present disclosure, numerical ranges described in the form of "a value 'to' another value" each include the value and the other value respectively as the minimum value and the maximum value.

In the present disclosure, among numerical ranges described in series, the upper limit value or the lower limit value of a numerical range may be replaced by the upper limit value or the lower limit value of one of other numerical ranges described in series. In the present disclosure, for numerical ranges, the upper limit value or the lower limit value of such a numerical range may be replaced by a value described in Examples.

In the present disclosure, the term "step" includes not only an independent step, but also a step that is not clearly distinguished from another step but that achieves the intended result of the step.

In the present disclosure, in the case of describing exemplary embodiments with reference to drawings, the configurations of the exemplary embodiments are not limited to the configurations illustrated in the drawings. In the drawings, the members are schematically drawn in the sizes and the relative size relationships between the members are not limited to these.

In the present disclosure, components may each include corresponding substances of plural species. In the present disclosure, for the descriptions of amounts of components in compositions, when, in such a composition, components each include corresponding substances of plural species, such an amount means the total amount of the substances of plural species in the composition unless otherwise specified.

In the present disclosure, components may each include corresponding particles of plural species. In such a case where, in a composition, components each include corresponding particles of plural species, the particle size of each component means the value of a mixture of the particles of plural species in the composition unless otherwise specified.

In the present disclosure, "(meth)acrylic" means at least one of acrylic or methacrylic, and "(meth)acrylate" means at least one of acrylate or methacrylate.

In the present disclosure, "electrostatic image developing toner" may also be referred to as "toner"; "electrostatic image developing carrier" may also be referred to as "carrier"; "electrostatic image developer" may also be referred to as "developer".

Electrostatic Image Developer

The electrostatic image developer according to the present exemplary embodiment includes a toner including toner particles that include a binder resin and a release agent and have an exposure ratio of the release agent of 15% or more and 30% or less, and a carrier including magnetic particles and resin cover layers covering the magnetic particles and including inorganic particles, wherein the inorganic particles have an arithmetic average particle size of 5 nm or more and 90 nm or less, the resin cover layers have an average thickness of 0.6 μm or more and 1.4 μm or less, and a fine-irregularity-structure surface roughness of surfaces of the carrier three-dimensionally analyzed has, in an analysis region, a ratio B/A of an irregularity-surface area B to a plan-view area A of 1.020 or more and 1.100 or less.

In the present exemplary embodiment, carbon black is not the inorganic particles.

The electrostatic image developer according to the present exemplary embodiment may suppress a decrease in the image density caused during continuous formation of images having low area coverage. This mechanism is inferred as follows.

In order to prevent offset during fixing, toners in which the release-agent exposure amount at the surfaces of the toners is controlled are used. In continuous output of high-density images using large amounts of toner for development, the loose external additive adheres to the release-agent exposure portions at the surfaces of the toner, to facilitate suppression of unwanted adhesion of the release agent to the surfaces of the carrier. However, in the case of continuous output at low area coverage (for example, in the case of printing on 50,000 A4-sized paper sheets at an area coverage of 5%), sinking of the loose external additive proceeds into the release agent exposed at the surfaces of the toner, so that the release agent at the surfaces of the toner adheres to the surfaces of the carrier, and triboelectrification is not sufficiently caused and stable image density is not sufficiently obtained, which results in a decrease in the image density. These have been found by the inventors of the present disclosure.

In the case of using the electrostatic image developer according to the present exemplary embodiment, which has the above-described features, the following is inferred: the toner and the carrier may mostly come into point contact with each other, so that the area of the surfaces of the carrier to which the release agent at the surfaces of the toner adheres may be reduced; thus, even in the case of a toner having a large exposure amount of the release agent at the surfaces, appropriate triboelectrification may be imparted, and the decrease in the image density caused during continuous formation of images having low area coverage may be suppressed (hereafter, also referred to as "suppression of change in image density").

Hereinafter, the configuration of the electrostatic image developer according to the present exemplary embodiment will be described in detail.

Carrier

The electrostatic image developer according to the present exemplary embodiment includes a carrier including magnetic particles and resin cover layers covering the magnetic particles and including inorganic particles, wherein the inorganic particles have an arithmetic average particle size of 5 nm or more and 90 nm or less, the resin cover layers have an average thickness of 0.6 μm or more and 1.4 μm or less, and the fine-irregularity-structure surface roughness of the surfaces of the carrier three-dimensionally analyzed has, in the analysis region, a ratio B/A of the irregularity-surface area B to the plan-view area A of 1.020 or more and 1.100 or less.

Ratio B/A of Surface Area B to Plan-View Area A from Three-Dimensional Analysis of Surfaces of Carrier For the carrier used in the present exemplary embodiment, the ratio B/A of the surface area B to the plan-view area A from three-dimensional analysis of the surfaces of the carrier is 1.020 or more and 1.100 or less, from the viewpoint of suppression of change in image density, preferably 1.040 or more and 1.080 or less, more preferably 1.040 or more and 1.070 or less.

In the present exemplary embodiment, the ratio B/A is an evaluation index of surface roughness. The ratio B/A is determined, for example, in the following manner.

As an apparatus for three-dimensionally analyzing the surfaces of the carrier, a scanning electron microscope (for example, manufactured by ELIONIX INC., surface roughness analysis 3D scanning electron microscope ERA-8900FE) including four secondary-electron detectors is used to perform analysis as described below.

The surface of a single particle of the carrier is magnified at ×5,000. Measurement points are defined at intervals of 0.06 μm such that 400 measurement points are arranged in the long-side direction and 300 measurement points are arranged in the short-side direction; the resultant region of 24 μm×18 μm is measured to obtain three-dimensional image data.

For the three-dimensional image data, a spline filter (a frequency selection filter using a spline function) with a limit wavelength set at 12 μm is used to remove wavelengths of periods of 12 μm or more are removed, to thereby remove the waviness component of the surface of the carrier to extract the roughness component, which provides a roughness profile.

Furthermore, a Gaussian high-pass filter (a frequency selection filter using a Gaussian function) with a cutoff value set at 2.0 μm is used to remove wavelengths of periods of 2.0 μm or more. As a result, from the roughness profile provided by processing using the spline filter, the wavelengths corresponding to the protrusions of the magnetic particles exposed at the surface of the carrier are removed, to provide a roughness profile from which the wavelength components of periods of 2.0 μm or more have been removed.

From the three-dimensional roughness profile data provided by processing using the filters, the surface area B ($\mu m^2$) of a central region of 12 μm×12 μm (plan-view area A=144 $\mu m^2$) is determined and the ratio B/A is determined. For 100 particles of the carrier, the ratios B/A are determined and arithmetically averaged.

Magnetic Particles

The carrier used in the present exemplary embodiment includes magnetic particles and resin cover layers covering the magnetic particles.

As the material of the magnetic particles, publicly known materials used as the core materials of carriers are applicable.

Specific examples of the magnetic particles include particles of magnetic metals such as iron, nickel, and cobalt; particles of magnetic oxides such as ferrite and magnetite;

resin-impregnated magnetic particles in which porous magnetic powder is impregnated with resin; and magnetic-powder-dispersed resin particles in which magnetic powder is added so as to be dispersed in resin. In the present exemplary embodiment, the magnetic particles are preferably ferrite particles.

The volume-average particle size of the magnetic particles is, from the viewpoint of suppression of change in image density, preferably 15 μm or more and 100 μm or less, more preferably 20 μm or more and 80 μm or less, still more preferably 30 μm or more and 60 μm or less.

In the present exemplary embodiment, the volume-average particle sizes of the magnetic particles and the carrier are values measured using a laser diffraction particle size distribution analyzer LA-700 (manufactured by HORIBA, Ltd.). Specifically, the particle size distribution measured by the analyzer is divided into particle size ranges (channels). Over these channels, a volume-based cumulative curve is drawn from the smaller to larger particle sizes. A particle size corresponding to a cumulative value of 50% is determined as the volume-average particle size.

A method of separating the magnetic particles from the carrier may be a method of using an organic solvent to dissolve the resin cover layers to separate the magnetic particles. Alternatively, a method described later in measurement of BET specific surface area may be used.

The arithmetic average height Ra (JIS B0601:2001) of the roughness profile of the magnetic particles is preferably 0.1 μm or more and 1.5 μm or less, more preferably 0.2 μm or more and 1.3 μm or less, particularly preferably 0.3 μm or more and 1.2 μm or less.

The arithmetic average height Ra of the roughness profile of the magnetic particles is determined in the following manner. A surface profiler (for example, "long-focal-distance color 3D surface profiler microscope VK-9700" manufactured by Keyence Corporation) is used at an appropriate magnification (for example, at a magnification of ×1000) to observe the magnetic particles, and a roughness profile is provided using a cutoff value set at 0.08 mm; from the roughness profile, irregularities are extracted in the direction of the mean line and over a sampling length of 10 μm and the arithmetic average height Ra is determined. For 100 magnetic particles, Ra's are arithmetically averaged.

For the magnetic force of the magnetic particles, the saturation magnetization in a magnetic field of 3,000 Oe is preferably 50 emu/g or more, more preferably 60 emu/g or more. The saturation magnetization is measured using a Vibrating Sample Magnetometer VSMP10-15 (manufactured by Toei Industry Co., Ltd.). The measurement sample is loaded into a cell having an inner diameter of 7 mm and a height of 5 mm, and set to the above-described apparatus. The measurement is performed under application of a magnetic field and the magnetic field strength is swept to 3000 Oe at the maximum. Subsequently, the magnetic field applied is reduced and a hysteresis curve is created on recording paper. From the data of the curve, saturation magnetization, residual magnetization, and coercive force are determined.

The magnetic particles preferably have a volume electric resistivity (volume resistivity) of $1\times10^5$ Ω·cm or more and $1\times10^9$ Ω·cm or less, more preferably $1\times10^7$ Ω·cm or more and $1\times10^9$ Ω·cm or less.

The volume electric resistivity (Ω·cm) of the magnetic particles is measured in the following manner. On a surface of a circular jig having 20 $cm^2$ electrode plates, the measurement sample is flatly placed to form a layer having a thickness of 1 mm or more and 3 mm or less. On this, one of the above-described 20 $cm^2$ electrode plates is placed to sandwich the layer. In order to remove gaps in the measurement sample, a load of 4 kg is applied onto the electrode plate disposed over the layer, and the thickness (cm) of the layer is measured. To the two electrodes over and under the layer, an electrometer and a high voltage power supply are connected. To the two electrodes, a high voltage is applied such that the electric field strength reaches $10^{3.8}$ V/cm, during which the value (A) of a current flowing is read. The measurement environment is set to have a temperature of 20° C. and a relative humidity of 50%. The formula of the volume electric resistivity (Ω·cm) of the measurement sample is as follows.

$$R=E\times20/(I-I_0)/L$$

In this formula, R represents the volume electric resistivity (Ω·m) of the measurement sample, E represents the applied voltage (V), I represents the value (A) of the current, $I_0$ represents the value (A) of the current at an applied voltage of 0 V, and L represents the thickness (cm) of the layer. The coefficient 20 is the area ($cm^2$) of the electrode plates.

Resin Cover Layers

The carrier used in the present exemplary embodiment includes magnetic particles and resin cover layers covering the magnetic particles and including inorganic particles, wherein the inorganic particles have an arithmetic average particle size of 5 nm or more and 90 nm or less and the resin cover layers have an average thickness of 0.6 μm or more and 1.4 μm or less.

In the present exemplary embodiment, the average thickness of the resin cover layers is 0.6 μm or more and 1.4 μm or less, from the viewpoint of suppression of change in image density, preferably 0.8 μm or more and 1.2 μm or less, more preferably 0.8 μm or more and 1.1 μm or less.

In the resin cover layers, the arithmetic average particle size of the inorganic particles is 5 nm or more and 90 nm or less, from the viewpoint of suppression of change in image density, preferably 8 nm or more and 70 nm or less, more preferably 5 nm or more and 50 nm or less, particularly preferably 10 nm or more and 50 nm or less.

In the present exemplary embodiment, the average particle size of the inorganic particles included in the resin cover layers and the average thickness of the resin cover layers are determined in the following manner.

The carrier is embedded in an epoxy resin and a microtome is used for cutting to form a carrier section. The carrier section is photographed using a scanning electron microscope (SEM) and the resultant SEM image is imported into an image processing analyzer and subjected to image analysis. In the resin cover layers, 100 inorganic particles (primary particles) are randomly selected, and their equivalent circular diameters (nm) are determined and arithmetically averaged to determine the average particle size (nm) of the inorganic particles. The thicknesses (μm) of the resin cover layer at randomly selected 10 points of a single particle of the carrier are measured; this measurement is further performed for 100 particles of the carrier, and all the measured thicknesses are arithmetically averaged to determine the average thickness (μm) of the resin cover layers.

Examples of the inorganic particles included in the resin cover layers include particles of a metal oxide such as silica, titanium oxide, zinc oxide, or tin oxide; particles of a metal compound such as barium sulfate, aluminum borate, or potassium titanate; and particles of a metal such as gold, silver, or copper.

Of these, from the viewpoint of suppression of change in image density, preferred are inorganic oxide particles, and more preferred are silica particles.

When the toner includes an external additive, from the viewpoint of suppression of change in image density, the inorganic particles may be particles having the same charging polarity as in the external additive.

The inorganic particles may have surfaces having been subjected to a hydrophobizing treatment. Examples of the hydrophobizing agent include publicly known organic silicon compounds having an alkyl group (such as a methyl group, an ethyl group, a propyl group, or a butyl group); specific examples include alkoxysilane compounds, siloxane compounds, and silazane compounds. Of these, the hydrophobizing agent is preferably a silazane compound, preferably hexamethyldisilazane. Such hydrophobizing agents may be used alone or in combination of two or more thereof.

Examples of the method of subjecting the inorganic particles to a hydrophobizing treatment using a hydrophobizing agent include a method of using supercritical carbon dioxide to dissolve a hydrophobizing agent in supercritical carbon dioxide to cause the hydrophobizing agent to adhere to the surfaces of the inorganic particles; a method of performing, in the air, application (for example, spraying or coating) of a solution including a hydrophobizing agent and a solvent in which the hydrophobizing agent dissolves onto the surfaces of the inorganic particles, to cause the hydrophobizing agent to adhere to the surfaces of the inorganic particles; and a method of, in the air, adding, to an inorganic particle dispersion liquid, a solution including a hydrophobizing agent and a solvent in which the hydrophobizing agent dissolves, and holding and subsequently drying the mixed solution of the inorganic particle dispersion liquid and the solution.

In the resin cover layers, the inorganic particle content relative to the total mass of the resin cover layers is, from the viewpoint of suppression of change in image density, preferably 10 mass % or more and 60 mass % or less, more preferably 15 mass % or more and 55 mass % or less, still more preferably 20 mass % or more and 50 mass % or less.

In the resin cover layers, the silica particle content relative to the total mass of the resin cover layers is, from the viewpoint of suppression of change in image density, preferably 10 mass % or more and 60 mass % or less, more preferably 15 mass % or more and 55 mass % or less, still more preferably 20 mass % or more and 50 mass % or less.

In the carrier used in the present exemplary embodiment, the silicon element concentration in the surfaces of the carrier measured by X-ray photoelectron spectroscopy is, from the viewpoint of long-term image-quality stability and suppression of change in image density, preferably more than 2 atomic % and less than 20 atomic %, more preferably more than 5 atomic % and less than 20 atomic %, particularly preferably more than 6 atomic % and less than 19 atomic %.

In the present exemplary embodiment, the silicon element concentration in the surfaces of the carrier is measured in the following manner.

The carrier serving as the sample is analyzed under the following conditions by X-ray photoelectron spectroscopy (XPS) to measure, on the basis of the peak intensities of elements, the silicon element concentration (atomic %).

XPS apparatus: manufactured by ULVAC-PHI, Inc., VersaProbe II

Etching gun: argon gun

Acceleration voltage: 5 kV

Emission current: 20 mA

Sputtering region: 2 mm×2 mm

Sputtering rate: 3 nm/min (in terms of $SiO_2$)

Examples of the resin forming the resin cover layers include styrene-acrylic acid copolymers; polyolefin resins such as polyethylene and polypropylene; polyvinyl-based or polyvinylidene-based resins such as polystyrene, acrylic resin, polyacrylonitrile, polyvinyl acetate, polyvinyl alcohol, polyvinyl butyral, polyvinyl chloride, polyvinylcarbazole, polyvinyl ether, and polyvinyl ketone; vinyl chloride-vinyl acetate copolymers; straight silicone resin constituted by organosiloxane bonds or modified resins thereof; fluororesins such as polytetrafluoroethylene, polyvinyl fluoride, polyvinylidene fluoride, and polychlorotrifluoroethylene; polyester; polyurethane; polycarbonate; amino resins such as urea-formaldehyde resin; and epoxy resin.

In particular, the resin forming the resin cover layers, from the viewpoint of chargeability, external additive adhesion controllability, and suppression of change in image density, preferably includes acrylic resin, more preferably includes 50 mass % or more of acrylic resin relative to the total resin mass in the resin cover layers, particularly preferably includes 80 mass % or more of acrylic resin relative to the total resin mass in the resin cover layers.

The resin cover layers, from the viewpoint of suppression of change in image density, preferably contains an acrylic resin having an alicyclic structure. The polymerizable component for the acrylic resin having an alicyclic structure is preferably a lower alkyl ester of (meth)acrylic acid (such as an alkyl ester of (meth)acrylic acid having an alkyl group having 1 or more and 9 or less carbon atoms); specific examples include methyl (meth)acrylate, ethyl (meth)acrylate, propyl (meth)acrylate, butyl (meth)acrylate, hexyl (meth)acrylate, cyclohexyl (meth)acrylate, and 2-ethylhexyl (meth)acrylate. These monomers may be used alone or in combination of two or more thereof.

The acrylic resin having an alicyclic structure preferably includes, as a polymerizable component, cyclohexyl (meth) acrylate. In the acrylic resin having an alicyclic structure, the content of a monomer unit derived from cyclohexyl (meth) acrylate relative to the total mass of the acrylic resin having an alicyclic structure is preferably 75 mass % or more and 100 mass % or less, more preferably 85 mass % or more and 100 mass % or less, still more preferably 95 mass % or more and 100 mass % or less.

The resin included in the resin cover layers preferably has a weight-average molecular weight of less than 300,000, more preferably less than 250,000, still more preferably 5,000 or more and less than 250,000, particularly preferably 10,000 or more and 200,000 or less. When such a range is satisfied, the resin cover layers may have improved abrasion resistance and appropriate triboelectrification may be imparted for a long term, so that better suppression of change in image density may be achieved.

The resin cover layers may include conductive particles for the purpose of controlling charging or resistance. Examples of the conductive particles include carbon black and particles having conductivity among the above-described inorganic particles.

Examples of the process of forming the resin cover layers over the surfaces of the magnetic particles include a wet formation process and a dry formation process. The wet formation process is a formation process of using a solvent in which the resin forming the resin cover layers is dissolved or dispersed. On the other hand, the dry formation process is a formation process of not using the solvent.

Examples of the wet formation process include an immersion process of coating magnetic particles by immersion into a resin-cover-layer-forming resin liquid; a spraying process of spraying a resin-cover-layer-forming resin liquid to the surfaces of magnetic particles; a fluidized bed process of spraying, to magnetic particles being fluidized in a fluidized bed, a resin-cover-layer-forming resin liquid; and a kneader-coater process of mixing, in a kneader-coater, magnetic particles and a resin-cover-layer-forming resin liquid and removing the solvent. Such formation processes may be repeated or combined.

The resin-cover-layer-forming resin liquid used in the wet formation process is prepared by dissolving or dispersing resin, inorganic particles, and another component in a solvent. The solvent is not particularly limited; examples include aromatic hydrocarbons such as toluene and xylene; ketones such as acetone and methyl ethyl ketone; and ethers such as tetrahydrofuran and dioxane.

The dry formation process is, for example, a process of heating a mixture of magnetic particles and a resin-cover-layer-forming resin in a dry state to form resin cover layers. Specifically, for example, magnetic particles and a resin-cover-layer-forming resin are, in a gas phase, mixed and heated to melt, to form resin cover layers.

The ratio B/A is controllable by adjusting production conditions.

For example, in a production method of performing the kneader-coater process plural times (for example, twice) to form resin cover layers in a stepwise manner, in the final kneader-coater step, the time for mixing the particles to be coated and the resin-cover-layer-forming resin liquid is adjusted, to control the ratio B/A. With an increase in the time for mixing in the final kneader-coater step, the ratio B/A tends to decrease.

Alternatively, for example, in a production method of applying, onto the surfaces of a resin-covered carrier produced by the kneader-coater process, a liquid composition including inorganic particles (may or may not include resin) by spraying, the particle size or content of the inorganic particles in the liquid composition or the amount of liquid composition applied relative to the resin-covered carrier is adjusted, to control the ratio B/A.

The exposure area ratio of the magnetic particles at the surfaces of the carrier is preferably 5% or more and 30% or less, more preferably 7% or more and 25% or less, still more preferably 10% or more and 25% or less. The exposure area ratio of the magnetic particles in the carrier is controllable by adjusting the amount of resin used for forming the resin cover layers; the larger the amount of resin relative to the amount of magnetic particles, the lower the exposure area ratio.

The exposure area ratio of the magnetic particles at the surfaces of the carrier is a value determined in the following manner.

A carrier to be measured and magnetic particles provided by removing the resin cover layers from the carrier to be measured are prepared. Examples of the method of removing the resin cover layers from the carrier include a method of using an organic solvent to dissolve the resin component to remove the resin cover layers, and a method of performing heating at about 800° C. to eliminate the resin component to remove the resin cover layers. The carrier and the magnetic particles are used as measurement samples and measured by XPS to determine the Fe concentrations (atomic %) at the surfaces of the samples; (Fe concentration of carrier)/(Fe concentration of magnetic particles)×100 is calculated as the exposure area ratio (%) of the magnetic particles.

The volume-average particle size of the carrier is, from the viewpoint of suppression of change in density, preferably 25 μm or more and 36 μm or less, more preferably 26 μm or more and 35 μm or less, particularly preferably 28 μm or more and 34 μm or less.

In the developer, the mixing ratio (mass ratio) of the carrier to the toner is preferably carrier:toner=100:1 to 100:30, more preferably 100:3 to 100:20.

Toner

The toner used in the present exemplary embodiment includes toner particles that include a binder resin and a release agent and have an exposure ratio of the release agent of 15% or more and 30% or less.

The toner used in the present exemplary embodiment may include toner particles and an external additive.

Toner Particles

The toner particles include, for example, a binder resin, a release agent, and, as needed, a coloring material and another additive.

Binder Resin

Examples of the binder resin include vinyl-based resins composed of homopolymers of monomers such as styrenes (such as styrene, para-chlorostyrene, and α-methylstyrene), (meth)acrylic acid esters (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene), or copolymers of a combination of two or more of these monomers.

Other examples of the binder resin include non-vinyl-based resins such as epoxy resin, polyester resin, polyurethane resin, polyamide resin, cellulose resin, polyether resin, and modified rosin, mixtures of these and the above-described vinyl-based resins, and graft polymers obtained by polymerizing vinyl-based monomers in the presence of the foregoing.

These binder resins may be used alone or in combination of two or more thereof.

As the binder resin, polyester resin is preferred.

The polyester resin is, for example, publicly known amorphous polyester resin. As the polyester resin, amorphous polyester resin may be used in combination with crystalline polyester resin. Note that the crystalline polyester resin may be used such that its content relative to the total binder resin is in the range of 2 mass % or more and 40 mass % or less (preferably 2 mass % or more and 20 mass % or less).

The "crystalline" resin has, as measured by differential scanning calorimetry (DSC), not a stepped endothermic change, but a clear endothermic peak; specifically, as measured at a heating rate of 10(° C./min), the endothermic peak has a half width of 10° C. or less.

On the other hand, the "amorphous" resin has a half width of more than 10° C., and has a stepped endothermic change or does not have a clear endothermic peak.

Amorphous Polyester Resin

The amorphous polyester resin is, for example, a polycondensation product of a polycarboxylic acid and a polyhydric alcohol. The amorphous polyester resin may be a commercially available product or may be synthesized.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides of the foregoing, and lower alkyl (having 1 or more and 5 or less carbon atoms, for example) esters of the foregoing. Of these, as the polycarboxylic acid, for example, preferred are aromatic dicarboxylic acids.

As the polycarboxylic acid, in addition to a dicarboxylic acid, a tri- or higher valent carboxylic acid having a crosslinkable structure or a branched structure may be used. Examples of the tri- or higher valent carboxylic acid include trimellitic acid, pyromellitic acid, anhydrides of the foregoing, and lower alkyl (having 1 or more and 5 or less carbon atoms, for example) esters of the foregoing.

Such polycarboxylic acids may be used alone or in combination of two or more thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). Of these, as the polyhydric alcohol, for example, preferred are aromatic diols and alicyclic diols, and more preferred are aromatic diols.

As the polyhydric alcohol, in addition to a diol, a tri- or higher valent polyhydric alcohol having a crosslinkable structure or a branched structure may be used. Examples of the tri- or higher valent polyhydric alcohol include glycerol, trimethylolpropane, and pentaerythritol.

Such polyhydric alcohols may be used alone or in combination of two or more thereof.

The amorphous polyester resin preferably has a glass transition temperature (Tg) of 50° C. or more and 80° C. or less, more preferably 50° C. or more and 65° C. or less.

The glass transition temperature is determined from a differential scanning calorimetry (DSC) curve obtained by DSC, more specifically determined in accordance with "extrapolated glass transition onset temperature" described in "How to determine glass transition temperature" in JIS K7121:1987 "Testing Methods for Transition Temperature of Plastics".

The amorphous polyester resin preferably has a weight-average molecular weight (Mw) of 5000 or more and 1000000 or less, more preferably 7000 or more and 500000 or less.

The amorphous polyester resin preferably has a number-average molecular weight (Mn) of 2000 or more and 100000 or less.

The amorphous polyester resin preferably has a polydispersity index Mw/Mn of 1.5 or more and 100 or less, more preferably 2 or more and 60 or less.

The weight-average molecular weight and the number-average molecular weight are measured by gel permeation chromatography (GPC). The molecular weight measurement by GPC is performed using, as the measurement apparatus, GPC-HLC-8120GPC manufactured by Tosoh Corporation, using a column manufactured by Tosoh Corporation, TSKgel SuperHM-M (15 cm), and using a THF solvent. The weight-average molecular weight and the number-average molecular weight are calculated on the basis of the measurement results using a molecular weight calibration curve created using monodisperse polystyrene standard samples.

The amorphous polyester resin is obtained by a publicly known production method. Specifically, the method is, for example, a method in which the polymerization temperature is set at 180° C. or more and 230° C. or less, the pressure within the reaction system is reduced as needed, and the reaction is caused while water or alcohol generated during condensation is removed.

When the monomers serving as starting materials do not dissolve or mix under the reaction temperature, a solvent having a high boiling point may be added as a solubilizing agent to achieve dissolution. In this case, the polycondensation reaction is caused while the solubilizing agent is driven off. When the copolymerization reaction is to be performed using a monomer having low miscibility, the monomer having low miscibility and an acid or alcohol used for polycondensation with the monomer may be condensed in advance and then subjected to polycondensation with the main component.

Crystalline Polyester Resin

The crystalline polyester resin is, for example, a polycondensation product between a polycarboxylic acid and a polyhydric alcohol. The crystalline polyester resin may be a commercially available product or may be synthesized.

As the crystalline polyester resin, from the viewpoint of facilitation of formation of a crystalline structure, polycondensation products formed from linear aliphatic polymerizable monomers are preferred, compared with polymerizable monomers having aromatic rings.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (for example, dibasic acids such as phthalic acid, isophthalic acid, terephthalic acid, and naphthalene-2,6-dicarboxylic acid), anhydrides of the foregoing, and lower alkyl (having 1 or more and 5 or less carbon atoms, for example) esters of the foregoing.

As the polycarboxylic acid, in addition to a dicarboxylic acid, a tri- or higher valent carboxylic acid having a crosslinkable structure or a branched structure may be used. Examples of the trivalent carboxylic acid include aromatic carboxylic acids (such as 1,2,3-benzenetricarboxylic acid, 1,2,4-benzenetricarboxylic acid, and 1,2,4-naphthalenetricarboxylic acid), anhydrides of the foregoing, and lower alkyl (having 1 or more and 5 or less carbon atoms, for example) esters of the foregoing.

As the polycarboxylic acid, in addition to such a dicarboxylic acid, a dicarboxylic acid having a sulfonic group or a dicarboxylic acid having an ethylenically double bond may be used.

Such polycarboxylic acids may be used alone or in combination of two or more thereof.

Examples of the polyhydric alcohol include aliphatic diols (such as linear aliphatic diols having a main chain moiety having 7 or more and 20 or less carbon atoms). Examples of the aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Of these, preferred aliphatic diols are 1,8-octanediol, 1,9-nonanediol, and 1,10-decanediol.

As the polyhydric alcohol, in addition to a diol, a tri- or higher valent alcohol having a crosslinkable structure or a branched structure may be used. Examples of the tri- or higher valent alcohol include glycerol, trimethylolethane, trimethylolpropane, and pentaerythritol.

Such polyhydric alcohols may be used alone or in combination of two or more thereof.

The polyhydric alcohol may have an aliphatic diol content of 80 mol % or more, preferably 90 mol % or more.

The crystalline polyester resin preferably has a melting temperature of 50° C. or more and 100° C. or less, more preferably 55° C. or more and 90° C. or less, still more preferably 60° C. or more and 85° C. or less.

The melting temperature is determined on the basis of a differential scanning calorimetry (DSC) curve obtained by DSC in accordance with "melting peak temperature" described in "How to determine melting temperature" in JIS K7121:1987 "Testing Methods for Transition Temperature of Plastics".

The crystalline polyester resin may have a weight-average molecular weight (Mw) of 6,000 or more and 35,000 or less.

The crystalline polyester resin is obtained by, for example, as in the amorphous polyester, a publicly known production method.

The binder resin content relative to the total of the toner particles is preferably 40 mass % or more and 95 mass % or less, more preferably 50 mass % or more and 90 mass % or less, still more preferably 60 mass % or more and 85 mass % or less.

Release Agent

The toner particles used in the present exemplary embodiment are toner particles including a binder resin and a release agent and having an exposure ratio of the release agent of 15% or more and 30% or less.

The release-agent exposure ratio (exposure ratio of the release agent at the surfaces of the toner particles) is 15% or more and 30% or less, from the viewpoint of suppression of change in image density, preferably 18% or more and 30% or less, more preferably 20% or more and 28% or less, particularly preferably 21% or more and 27% or less.

The release-agent exposure ratio in the present exemplary embodiment is a value measured by XPS (X-ray photoelectron spectroscopy).

As the XPS measurement apparatus, JPS-9000MX manufactured by JEOL Ltd. is used; the measurement is performed using, as the X-ray source, MgKα radiation, at an acceleration voltage of 10 kV, and at an emission current of 30 mA. For the C1s spectrum, the peak separation method is performed to determine the amount of release agent at the surfaces of the toner. In the peak separation method, the measured C1s spectrum is separated into components by curve fitting using the method of least squares. Of the separated peaks, the area of a peak derived from the release agent and the composition ratio are used to calculate the exposure ratio. As the component spectra serving as the bases for separation, C1s spectra obtained by measuring individually the release agent and the binder resin used for preparation of the toner particles are used.

When the toner particles to be measured are an external-additive-containing toner, they are subjected to, together with a mixing solution of ion-exchanged water and a surfactant, ultrasonic wave treatment for 20 minutes to remove the external additive; the surfactant is removed, and the toner particles are dried, collected, and subsequently measured. Note that the process of removing the external additive may be repeatedly performed until removal of the external additive is achieved.

The method of adjusting the amount of release agent exposed at the surfaces of the toner particles may be, from the viewpoint of dispersibility of the binder resin and the release agent and controllability of the amount of release agent exposed, a method in which, in a core-shell structure toner obtained by an aggregation-coalescence method, the cover layers (shell layers) covering the core parts are formed so as to include the binder resin and the release agent to obtain toner particles.

Examples of the release agent include hydrocarbon waxes; natural waxes such as carnauba wax, rice wax, and candelilla wax; synthetic or mineral or petroleum waxes such as montan wax; and ester waxes such as fatty acid esters and montanic acid esters. The release agent is not limited to these.

The release agent preferably has a melting temperature of 50° C. or more and 110° C. or less, more preferably 60° C. or more and 100° C. or less.

The melting temperature is determined on the basis of a differential scanning calorimetry (DSC) curve obtained by DSC in accordance with "melting peak temperature" described in "How to determine melting temperature" described in JIS K7121:1987 "Testing Methods for Transition Temperature of Plastics".

The release agent content relative to the total of the toner particles is preferably 1 mass % or more and 20 mass % or less, more preferably 5 mass % or more and 15 mass % or less.

Coloring Material

Examples of the coloring material include pigments such as carbon black, Chrome Yellow, Hansa yellow, Benzidine Yellow, Threne Yellow, Quinoline Yellow, Pigment Yellow, Permanent Orange GTR, Pyrazolone Orange, Vulcan Orange, Watchung Red, Permanent Red, Brilliant Carmine 3B, Brilliant Carmine 6B, Dupont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue chloride, Phthalocyanine Blue, Pigment Blue, Phthalocyanine Green, and Malachite Green Oxalate; and dyes such as acridine-based, xanthene-based, azo-based, benzoquinone-based, azine-based, anthraquinone-based, thioindigo-based, dioxazine-based, thiazine-based, azomethine-based, indigo-based, phthalocyanine-based, aniline black-based, polymethine-based, triphenylmethane-based, diphenylmethane-based, and thiazole-based dyes.

Such coloring materials may be used alone or in combination of two or more thereof.

As the coloring material, a surface-treated coloring material may be used as needed and may be used in combination with a dispersing agent. As the coloring material, plural coloring materials may be used in combination.

The coloring material content relative to the total of the toner particles is preferably 1 mass % or more and 30 mass % or less, more preferably 3 mass % or more and 15 mass % or less.

Another Additive

Examples of the other additive include publicly known additives such as magnetic substances, charge control agents, and inorganic powders. These additives are included, as internal additives, in toner particles.

Properties Etc. Of Toner Particles

The toner particles may be toner particles having a monolayer structure or toner particles having, what is called, a core-shell structure constituted by a core part (core particle) and a cover layer (shell layer) covering the core part.

The toner particles having a core-shell structure may be constituted by, for example, a core part including a binder resin and optional other additives such as a coloring material and a release agent, and a cover layer including a binder resin.

The toner particles preferably have a volume-average particle size (D50v) of 2 μm or more and 10 μm or less, more preferably 4 μm or more and 8 μm or less.

The volume-average particle size (D50v) of the toner particles is measured using a Coulter Multisizer II (manufactured by Beckman Coulter, Inc.) and using, as the electrolytic solution, ISOTON-II (manufactured by Beckman Coulter, Inc.).

In the measurement, to 2 ml of a 5 mass % aqueous solution of a surfactant (preferably sodium alkylbenzene sulfonate) serving as a dispersing agent, 0.5 mg or more and 50 mg or less of the measurement sample is added. This is added to 100 ml or more and 150 ml or less of the electrolytic solution.

The electrolytic solution in which the sample has been suspended is subjected to dispersing treatment for 1 minute using an ultrasonic dispersing machine, and Coulter Multisizer II is used with an aperture having an aperture diameter of 100 μm to measure the particle size distribution of particles having a particle size in the range of 2 μm or more and 60 μm or less. The number of particles sampled is 50000. A volume-based particle size distribution curve is drawn from the smaller to larger particle sizes, and a particle size corresponding to a cumulative value of 50% is determined as volume-average particle size D50v.

The toner particles preferably have an average circularity of 0.90 or more and 1.00 or less, more preferably 0.92 or more and 0.98 or less.

The average circularity of the toner particles is determined by (circumference of equivalent circle)/(circumference) [(circumference of circle having the same projection area as in image of particle)/(circumference of projection image of particle)]. Specifically, the average circularity is a value measured in the following manner.

First, toner particles to be measured are sampled by suctioning and caused to form a flat flow; a stroboscope is caused to flash momentarily to obtain, as a still picture, the image of particles, and the image of particles is subjected to image analysis using a flow particle image analyzer (FPIA-3000 manufactured by SYSMEX CORPORATION) to determine the average circularity. The number of particles sampled for determining average circularity is 3500.

When the toner includes an external additive, the toner (developer) to be measured is dispersed in water including a surfactant, and subsequently subjected to ultrasonic treatment to obtain toner particles from which the external additive has been removed.

Method for Producing Toner Particles

The toner particles may be produced by a dry production method (such as a kneading-pulverization method) or a wet production method (such as an aggregation-coalescence method, a suspension polymerization method, or a dissolution-suspension method). For these production methods, limitations are not particularly placed and publicly known production methods are employed.

Specifically, for example, in the case of producing the toner particles by the aggregation-coalescence method, the following steps are performed to produce the toner particles: a step of preparing a resin-particle dispersion liquid in which resin particles that are to serve as a binder resin are dispersed (resin-particle-dispersion-liquid preparation step); a step of aggregating, in the resin-particle dispersion liquid (or in a dispersion liquid provided by mixing the resin-particle dispersion liquid with another particle dispersion liquid as needed), the resin particles (and the other particles as needed) to form aggregate particles (aggregate-particle formation step); and a step of heating the aggregate-particle dispersion liquid in which the aggregate particles are dispersed, to fuse and coalesce the aggregate particles, to form the toner particles (fusion-coalescence step).

Hereinafter, the steps will be described in detail.

In the following descriptions, the method for obtaining toner particles including a coloring material and a release agent will be described; however, the coloring material and the release agent are used as needed. It is appreciated that another additive other than the coloring material and the release agent may be used.

Resin-Particle-Dispersion-Liquid Preparation Step

In addition to a resin-particle dispersion liquid in which resin particles that are to serve as a binder resin are dispersed, for example, a coloring-material-particle dispersion liquid in which coloring material particles are dispersed and a release-agent-particle dispersion liquid in which release agent particles are dispersed are prepared.

The resin-particle dispersion liquid is prepared by, for example, dispersing resin particles using a surfactant in a dispersion medium.

Examples of the dispersion medium used for the resin-particle dispersion liquid include aqueous media.

Examples of the aqueous media include waters such as distilled water and ion-exchanged water and alcohols. These may be used alone or in combination of two or more thereof.

Examples of the surfactant include anionic surfactants such as sulfuric acid ester salt-based, sulfonic acid salt-based, phosphoric acid ester-based, and soap-based surfactants; cationic surfactants such as amine salt-type and quaternary ammonium salt-type surfactants; and nonionic surfactants such as polyethylene glycol-based, alkylphenol ethylene oxide adduct-based, and polyhydric alcohol-based surfactants. Of these, in particular, anionic surfactants and cationic surfactants may be used. Such a nonionic surfactant may be used in combination with an anionic surfactant or a cationic surfactant.

Such surfactants may be used alone or in combination of two or more thereof.

For the resin-particle dispersion liquid, examples of the method of dispersing resin particles in a dispersion medium include ordinary dispersing methods using a rotary-shearing homogenizer or a media-equipped ball mill, sand mill, or DYNO-MILL, for example. Alternatively, depending on the type of the resin particles, a phase inversion emulsification method may be performed to disperse the resin particles in a dispersion medium. The phase inversion emulsification method is a method of dissolving the resin to be dispersed, in a hydrophobic organic solvent in which the resin is soluble, adding a base to the organic continuous phase (O phase) to achieve neutralization, and subsequently adding an aqueous medium (W phase) to cause phase inversion from W/O to O/W, to achieve dispersing of the resin in the form of particles in the aqueous medium.

The resin particles dispersed in the resin-particle dispersion liquid preferably have a volume-average particle size of, for example, 0.01 μm or more and 1 μm or less, more preferably 0.08 μm or more and 0.8 μm or less, still more preferably 0.1 μm or more and 0.6 μm or less.

For the volume-average particle size of the resin particles, a laser diffraction particle size distribution analyzer (such as LA-700 manufactured by HORIBA, Ltd.) is used for measurement to obtain a particle size distribution. The particle size distribution is divided into particle size ranges (channels). Over these channels, a volume-based cumulative curve is drawn from the smaller to larger particle sizes. The particle size corresponding to a cumulative value of 50% relative to the whole particles is measured as volume-average particle size D50v. Similarly, the volume-average particle sizes of particles in other dispersion liquids are also measured.

In the resin-particle dispersion liquid, the resin particle content is preferably 5 mass % or more and 50 mass % or less, more preferably 10 mass % or more and 40 mass % or less.

As with the resin-particle dispersion liquid, for example, the coloring-material-particle dispersion liquid and the release-agent-particle dispersion liquid are prepared. Specifically, in the resin-particle dispersion liquid, the volume-average particle size of the particles, the dispersion medium, the dispersing method, and the particle content also apply to the coloring material particles dispersed in the coloring-material-particle dispersion liquid and the release agent particles dispersed in the release-agent-particle dispersion liquid.

Aggregate-Particle Formation Step

Subsequently, the resin-particle dispersion liquid, the coloring-material-particle dispersion liquid, and the release-agent-particle dispersion liquid are mixed together.

Subsequently, in the mixed dispersion liquid, hetero-aggregation of the resin particles, the coloring material particles, and the release agent particles is caused to form aggregate particles including the resin particles, the coloring material particles, and the release agent particles and having diameters close to the diameters of the target toner particles.

Specifically, for example, an aggregating agent is added to the mixed dispersion liquid and the mixed dispersion liquid is adjusted in terms of pH so as to be acidic (such as a pH of 2 or more and 5 or less), and a dispersion stabilizing agent is added as needed; subsequently, the mixed dispersion liquid is heated to a temperature close to the glass transition temperature of the resin particles (specifically, for example, a temperature of "the glass transition temperature of the resin particles −30° C." or more and "the glass transition temperature −10° C." or less), to aggregate the particles dispersed in the mixed dispersion liquid, to form aggregate particles.

Alternatively, the aggregate-particle formation step may be performed in the following manner: for example, under stirring of the mixed dispersion liquid using a rotary-shearing homogenizer, an aggregating agent is added at room temperature (for example, 25° C.), the mixed dispersion liquid is adjusted in terms of pH so as to be acidic (such as a pH of 2 or more and 5 or less), and a dispersion stabilizing agent is added as needed; and, subsequently, heating is performed.

Examples of the aggregating agent include surfactants having a polarity opposite to that of the surfactant included in the mixed dispersion liquid, inorganic metal salts, and di- or higher valent metal complexes. In the case of using, as the aggregating agent, a metal complex, the amount of surfactant used may be reduced and charging characteristics may be improved.

Together with the aggregating agent, an additive that forms a complex or a similar bond with the metal ion of the aggregating agent may be used as needed. As this additive, a chelating agent may be used.

Examples of the inorganic metal salts include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may be used. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of chelating agent added relative to 100 parts by mass of the resin particles is preferably 0.01 parts by mass or more and 5.0 parts by mass or less, more preferably 0.1 parts by mass or more and less than 3.0 parts by mass.

Fusion-Coalescence Step

Subsequently, the aggregate-particle dispersion liquid in which the aggregate particles are dispersed is heated to, for example, the glass transition temperature or more of the resin particles (for example, a temperature 10° C. to 30° C. higher than the glass transition temperature of the resin particles), to fuse and coalesce the aggregate particles, to form toner particles.

The above-described steps are performed to provide toner particles.

Alternatively, the toner particles may be produced by performing a step of, after preparation of the aggregate-particle dispersion liquid in which the aggregate particles are dispersed, further mixing the aggregate-particle dispersion liquid and a resin-particle dispersion liquid in which resin particles and a release-agent-particle dispersion liquid are dispersed, to cause aggregation such that the resin particles further adhere to the surfaces of the aggregate particles, to form secondary aggregate particles; and a step of heating the secondary-aggregate-particle dispersion liquid in which the secondary aggregate particles are dispersed, to fuse and coalesce the secondary aggregate particles, to form toner particles having a core-shell structure.

After completion of the fusion-coalescence step, the toner particles formed in the solution are subjected to publicly known steps including a washing step, a solid-liquid separation step, and a drying step to obtain dry toner particles. As the washing step, from the viewpoint of chargeability, displacement washing using ion-exchanged water may be sufficiently performed. As the solid-liquid separation step, from the viewpoint of productivity, for example, suction filtration or pressure filtration may be performed. As the drying step, from the viewpoint of productivity, for example, freeze drying, flash drying, fluidized-bed drying, or vibrating fluidized-bed drying may be performed.

The toner used in the present exemplary embodiment is produced by, for example, adding and mixing an external additive with the obtained dry toner particles. The mixing may be performed using, for example, a V blender, a Henschel mixer, or a Loedige mixer. Furthermore, as needed, for example, a vibratory classifier or an air classifier may be used to remove coarse particles from the toner.

External Additive

The toner used in the present exemplary embodiment may include an external additive.

Examples of the external additive include inorganic particles. The inorganic particles are formed of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3.2SiO_2$, $CaCO_3$, $MgCO_3$, $BaSO_4$, or $MgSO_4$, for example.

In particular, from the viewpoint of suppression of change in image density, silica particles are preferably included.

The inorganic particles serving as the external additive may have surfaces having been subjected to hydrophobizing treatment. The hydrophobizing treatment is performed by, for example, immersing inorganic particles in a hydrophobizing agent. The hydrophobizing agent is not particularly limited, and examples include silane-based coupling agents, silicone oil, titanate-based coupling agents, and aluminum-based coupling agents. These may be used alone or in combination of two or more thereof.

The amount of hydrophobizing agent is ordinarily, for example, relative to 100 parts by mass of inorganic particles, 1 part by mass or more and 10 parts by mass or less.

Other examples of the external additive include resin particles (resin particles of polystyrene, polymethyl methacrylate, or melamine resin, for example), and cleaning active agents (such as metal salts of higher fatty acids represented by zinc stearate, and particles of fluoropolymers).

The amount of external additive externally added relative to toner particles is preferably 0.01 mass % or more and 5 mass % or less, more preferably 0.01 mass % or more and 2.0 mass % or less.

Image Forming Apparatus and Image Forming Method

The image forming apparatus according to the present exemplary embodiment includes an image holding member, a charging section configured to charge the surface of the image holding member, an electrostatic image forming section configured to form, on the charged surface of the image holding member, an electrostatic image, a developing section housing an electrostatic image developer and configured to develop, using the electrostatic image developer, the electrostatic image formed on the surface of the image holding member, to form a toner image, a transfer section configured to transfer, the toner image formed on the surface of the image holding member onto the surface of a recording medium, and a fixing section configured to fix the transferred toner image on the surface of the recording medium. As the electrostatic image developer, the electrostatic image developer according to the present exemplary embodiment is applied.

In the image forming apparatus according to the present exemplary embodiment, an image forming method (the image forming method according to the present exemplary embodiment) including the following steps is performed: a charging step of charging the surface of the image holding member; an electrostatic-image formation step of forming, on the charged surface of the image holding member, an electrostatic image; a development step of developing, using the electrostatic image developer according to the present exemplary embodiment, the electrostatic image formed on the surface of the image holding member, to form a toner image; a transfer step of transferring the toner image formed on the surface of the image holding member onto the surface of a recording medium; and a fixing step of fixing the transferred toner image on the surface of the recording medium.

As the image forming apparatus according to the present exemplary embodiment, a publicly known image forming apparatus is applied such as a direct transfer mode apparatus configured to directly transfer a toner image formed on the surface of an image holding member onto a recording medium; an intermediate transfer mode apparatus configured to perform first transfer of the toner image formed on the surface of the image holding member onto the surface of an intermediate transfer body, and to perform second transfer of the transferred toner image on the surface of the intermediate transfer body onto the surface of a recording medium; an apparatus including a cleaning section configured to, after transfer of the toner image, clean the surface (to be charged) of the image holding member; or an apparatus including a discharging section configured to, after transfer of the toner image, irradiate the surface (to be charged) of the image holding member with discharging light to achieve discharging.

When the image forming apparatus according to the present exemplary embodiment is an intermediate transfer mode apparatus, the transfer section has, for example, a configuration including an intermediate transfer body on the surface of which the toner image is transferred, a first transfer section configured to perform first transfer of the toner image formed on the surface of the image holding member onto the surface of the intermediate transfer body, and a second transfer section configured to perform second transfer of the transferred toner image on the surface of the intermediate transfer body, onto the surface of a recording medium.

In the image forming apparatus according to the present exemplary embodiment, for example, the part including the developing section may have a cartridge structure (process cartridge) attachable to and detachable from the image forming apparatus. The process cartridge may be, for example, a process cartridge that houses the electrostatic image developer according to the present exemplary embodiment and includes the developing section.

Hereinafter, a non-limiting example of the image forming apparatus according to the present exemplary embodiment will be described. In the following descriptions, some sections in the drawing will be described, but the other portions will not be described.

FIG. 1 is a schematic configuration view illustrating the image forming apparatus according to the present exemplary embodiment.

The image forming apparatus in FIG. 1 includes electrophotographic-system first to fourth image formation units 10Y, 10M, 10C, and 10K (image formation sections) configured to output images of individual colors of yellow (Y), magenta (M), cyan (C), and black (K) on the basis of color-separation image data. These image formation units (hereafter, may also be simply referred to as "units") 10Y, 10M, 10C, and 10K are arranged in the horizontal direction so as to be separated from each other at predetermined intervals. These units 10Y, 10M, 10C, and 10K may be process cartridges attachable to and detachable from the image forming apparatus.

In upper portions of the units 10Y, 10M, 10C, and 10K, an intermediate transfer belt (an example of the intermediate transfer body) 20 is disposed so as to extend through the units. The intermediate transfer belt 20 is wrapped around a driving roller 22 and a support roller 24 so as to be run in a direction from the first unit 10Y to the fourth unit 10K. The support roller 24 is urged by, for example, a spring (not shown) in a direction away from the driving roller 22, so that the intermediate transfer belt 20 wrapped around the rollers is stretched. On the image holding member-side surface of the intermediate transfer belt 20, an intermediate-transfer-body cleaning device 30 is disposed so as to face the driving roller 22.

To developing devices (examples of the developing section) 4Y, 4M, 4C, and 4K of the units 10Y, 10M, 10C, and 10K, yellow, magenta, cyan, and black toners housed in toner cartridges 8Y, 8M, 8C, and 8K are respectively supplied.

The first to fourth units 10Y, 10M, 10C, and 10K have the same configuration and operations, and hence the first unit 10Y disposed upstream in the running direction of the intermediate transfer belt and configured to form a yellow image will be described as a representative.

The first unit 10Y includes a photoreceptor 1Y serving as an image holding member. Around the photoreceptor 1Y, the following are sequentially disposed: a charging roller (an example of the charging section) 2Y configured to charge the surface of the photoreceptor 1Y to a predetermined potential; an exposure device (an example of the electrostatic image forming section) 3 configured to use a laser beam 3Y on the basis of color-separation image signals to expose the charged surface to form an electrostatic image; a developing device (an example of the developing section) 4Y configured to supply the charged toner to the electrostatic image to develop the electrostatic image; a first transfer roller 5Y (an example of the first transfer section) configured to transfer the developed toner image onto the intermediate transfer belt 20; and a photoreceptor cleaning device (an example of the cleaning section) 6Y configured to remove, after the first transfer, the residual toner on the surface of the photoreceptor 1Y.

The first transfer roller 5Y is disposed inside of the intermediate transfer belt 20 and at a position so as to face the photoreceptor 1Y. To the first transfer rollers 5Y, 5M, 5C, and 5K of the units, bias power supplies (not shown) configured to apply first transfer biases are individually connected. Each bias power supply applies a transfer bias variable under control by a controller (not shown), to the first transfer roller.

Hereinafter, in the first unit 10Y, the operations of forming a yellow image will be described.

First, before the operations, the charging roller 2Y charges the surface of the photoreceptor 1Y to a potential of −600 V to −800 V.

The photoreceptor 1Y is formed by forming, on a conductive (for example, a volume resistivity at 20° C. of $1\times10^{-6}$ Ωcm or less) base body, a photosensitive layer. This photosensitive layer has properties of normally having high resistivity (resistivity of ordinary resin), but, upon irradiation with a laser beam, having laser-beam irradiation portions having a different resistivity. Thus, the charged surface of the photoreceptor 1Y is irradiated with the laser beam 3Y from the exposure device 3 in accordance with the yellow image data transmitted from the controller (not shown). This forms an electrostatic image having the yellow image pattern on the surface of the photoreceptor 1Y.

The electrostatic image is an image formed on the surface of the photoreceptor 1Y by charging: the laser beam 3Y causes a decrease in the resistivity of the irradiated portions of the photosensitive layer where charges flow out from the charged surface of the photoreceptor 1Y while charges of the portions not irradiated with the laser beam 3Y remain, which results in formation of, what is called, a negative latent image.

The electrostatic image formed on the photoreceptor 1Y is rotated together with running of the photoreceptor 1Y to the predetermined development position. At this development position, the electrostatic image on the photoreceptor 1Y is developed and visualized by the developing device 4Y to form a toner image.

The developing device 4Y houses therein, for example, an electrostatic image developer including at least a yellow toner and a carrier. The yellow toner is stirred within the developing device 4Y to thereby be frictionally charged, and is held on the developer roller (an example of the developer holding member) so as to have charges having the same polarity (negative polarity) as in the charges on the charged photoreceptor 1Y. While the surface of the photoreceptor 1Y passes over the developing device 4Y, the yellow toner electrostatically adheres to the discharged latent image portions on the surface of the photoreceptor 1Y, so that the latent image is developed with the yellow toner. The photoreceptor 1Y having the yellow toner image formed is continuously run at the predetermined speed, to convey the developed toner image on the photoreceptor 1Y to the predetermined first transfer position.

When the yellow toner image on the photoreceptor 1Y is conveyed to the first transfer position, a first transfer bias is applied to the first transfer roller 5Y, an electrostatic force from the photoreceptor 1Y toward the first transfer roller 5Y affects the toner image, so that the toner image on the photoreceptor 1Y is transferred onto the intermediate transfer belt 20. The transfer bias applied at this time has a polarity (+) opposite to the polarity (−) of the toner, and is controlled to be, for example, +10 μA at the first unit 10Y by a controller (not shown).

On the other hand, the toner remaining on the photoreceptor 1Y is removed by the photoreceptor cleaning device 6Y and collected.

The first transfer biases applied to the first transfer rollers 5M, 5C, and 5K disposed in the second unit 10M and its downstream units are also controlled as in the first unit.

Thus, the intermediate transfer belt 20 onto which the yellow toner image has been transferred at the first unit 10Y is conveyed sequentially through the second to the fourth units 10M, 10C, and 10K, to perform multiple transfer of the toner images of the colors so as to be stacked.

The intermediate transfer belt 20 on which multiple transfer of the toner images of the four colors has been performed at the first to the fourth units reaches a second transfer unit constituted by the intermediate transfer belt 20, the support roller 24 in contact with the inner surface of the intermediate transfer belt, and a second transfer roller (an example of the second transfer section) 26 disposed on the image-holding-surface side of the intermediate transfer belt 20. On the other hand, a recording paper (an example of the recording medium) P is fed at a predetermined timing by a feeding mechanism to the gap where the second transfer roller 26 and the intermediate transfer belt 20 are in contact with each other, and a second transfer bias is applied to the support roller 24. The transfer bias applied at this time has a polarity (−) the same as the polarity (−) of the toner, and the electrostatic force from the intermediate transfer belt 20 toward the recording paper P affects the toner image, to transfer the toner image on the intermediate transfer belt 20 onto the recording paper P. The second transfer bias at this time is determined in response to the resistance of the second transfer unit detected by the resistance detection unit (not shown), and controlled on the basis of voltage.

Subsequently, the recording paper P is sent into the press region (nip) of the pair of fixing rollers in the fixing device (an example of the fixing section) 28, so that the toner image is fixed on the recording paper P, to form a fixed image.

Examples of the recording paper P onto which the toner image is transferred include plain paper used for electrophotographic-system copying machines and printers, for example. Examples of the recording medium include, in addition to the recording paper P, OHP sheets.

In order to further improve the smoothness of the surface of the fixed image, the recording paper P may have a smooth surface and, for example, the coat paper provided by coating the surface of the plain paper with, for example, resin and the art paper for printing may be used.

The recording paper P on which the color image has been fixed is conveyed to the exit unit, and the series of the color image formation operations is completed.

Process Cartridge

The process cartridge according to the present exemplary embodiment is a process cartridge that houses the electrostatic image developer according to the present exemplary embodiment, includes a developing section configured to develop, using the electrostatic image developer, an electrostatic image formed on the surface of an image holding member, to form a toner image, and is attachable to and detachable from an image forming apparatus.

The process cartridge according to the present exemplary embodiment is not limited to the above-described configuration, and may have a configuration including the developing section and, as needed, another section, for example, at least one selected from other sections such as an image holding member, a charging section, an electrostatic image forming section, and a transfer section.

Hereinafter, a non-limiting example of the process cartridge according to the present exemplary embodiment will be described. In the following descriptions, some sections illustrated in the drawing will be described, but the other portions will not be described.

Figure 2:
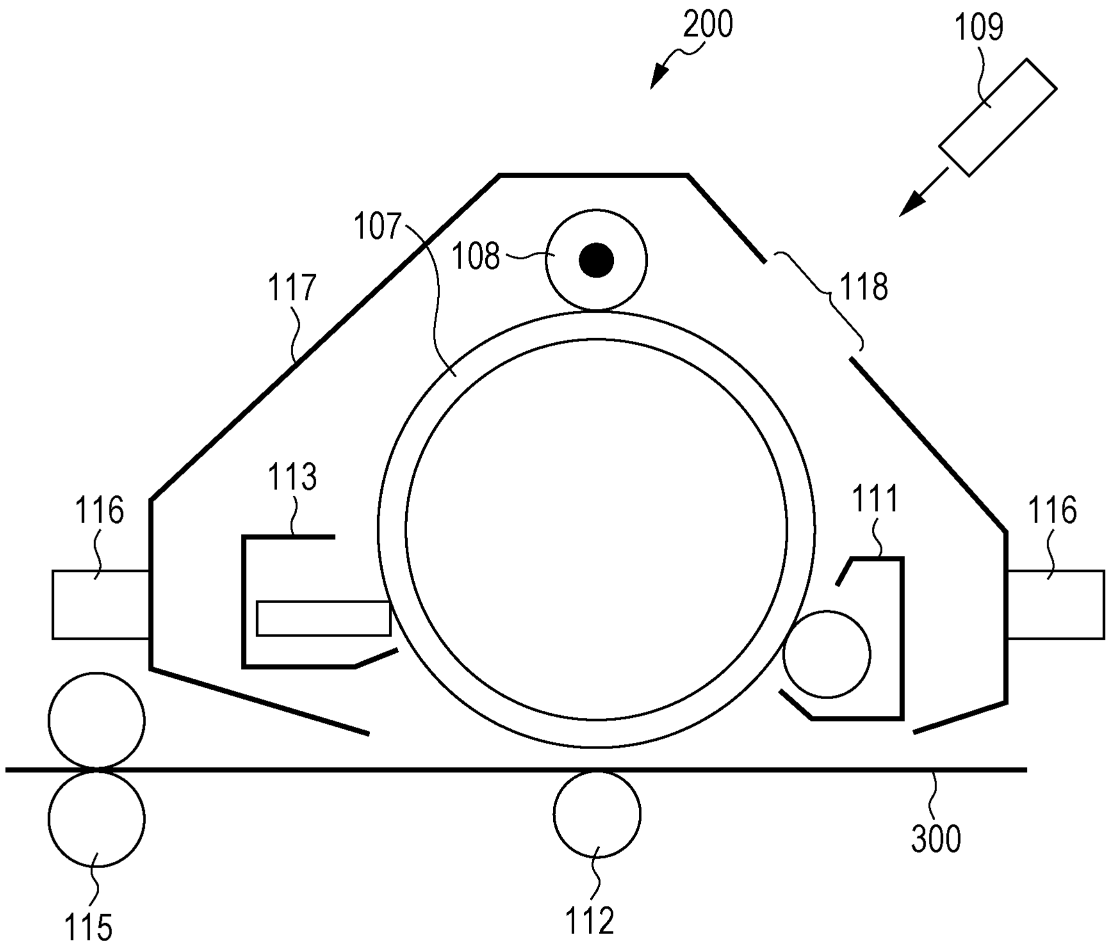
FIG. 2 is a schematic configuration view illustrating an example of a process cartridge attachable to and detachable from an image forming apparatus according to the present exemplary embodiment.

FIG. 2 is a schematic configuration view illustrating the process cartridge according to the present exemplary embodiment.

In a process cartridge 200 in FIG. 2, for example, an attachment rail 116 and a housing 117 having an opening 118 for exposure to light are used to integrally combine and hold a photoreceptor 107 (an example of the image holding member) and a charging roller 108 (an example of the charging section), a developing device 111 (an example of the developing section), and a photoreceptor cleaning device 113 (an example of the cleaning section) that are disposed around the photoreceptor 107, to provide a cartridge.

FIG. 2 illustrates an exposure device 109 (an example of the electrostatic image forming section), a transfer device 112 (an example of the transfer section), a fixing device 115 (an example of the fixing section), and a recording paper 300 (an example of the recording medium).

EXAMPLES

Hereinafter, exemplary embodiments according to the disclosure will be described in detail with reference to Examples; however, exemplary embodiments according to the disclosure are not limited to these Examples. In the following descriptions, "parts" and "%" are based on mass unless otherwise specified.

In the following descriptions, the volume-average particle size means a particle size D50v corresponding to a cumulative value of 50% in a volume-based particle size distribution curve drawn from the smaller to larger particle sizes.

Preparation of Toner

Preparation of Coloring-Material-Particle Dispersion Liquid 1

Cyan pigment (copper phthalocyanine B15:3, manufactured by Dainichiseika Color & Chemicals Mfg. Co., Ltd.): 50 parts by mass Anionic surfactant: Neogen SC (manufactured by DAI-ICHI KOGYO SEIYAKU CO., LTD.), 5 parts by mass Ion-exchanged water: 200 parts by mass The above-described components are mixed, and dispersed using an ULTRA-TURRAX manufactured by IKA-Werke GmbH & Co. KG for 5 minutes and further using an ultrasonic bath for 10 minutes, to obtain Coloring-material-particle dispersion liquid 1 having a solid content of 21%. A particle size analyzer LA-700 manufactured by HORIBA, Ltd. is used to measure the volume-average particle size and it is found to be 160 nm.

Preparation of Release-Agent-Particle Dispersion Liquid 1

Paraffin wax: HNP-9 (manufactured by NIPPON SEIRO CO., LTD.): 19 parts by mass

Anionic surfactant: Neogen SC (manufactured by DAI-ICHI KOGYO SEIYAKU CO., LTD.): 1 part by mass Ion-exchanged water: 80 parts by mass The above-described components are mixed together within a heat-resistant container, heated to 90° C., and stirred for 30 minutes. Subsequently, the molten liquid is passed from the bottom of the container through a Gaulin homogenizer, subjected to, under a pressure condition of 5 MPa, circulation processes corresponding to 3 passes, and subsequently subjected to, under an increased pressure of 35 MPa, circulation processes corresponding to 3 passes. The resultant emulsion is cooled in the heat-resistant container to 40° C. or less, to obtain Release-agent-particle dispersion liquid 1. A particle size analyzer LA-700 manufactured by HORIBA, Ltd. is used to measure the volume-average particle size and it is found to be 240 nm.

Resin-Particle Dispersion Liquid 1

Oil Layer

Styrene (manufactured by FUJIFILM Wako Pure Chemical Corporation): 30 parts by mass n-Butyl acrylate (manufactured by FUJIFILM Wako Pure Chemical Corporation): 10 parts by mass β-Carboxyethyl acrylate (manufactured by Rhodia Nicca, Ltd.): 1.3 parts by mass Dodecanethiol (manufactured by FUJIFILM Wako Pure Chemical Corporation): 0.4 parts by mass Aqueous Layer 1

Ion-exchanged water: 17 parts by mass

Anionic surfactant (Dowfax, manufactured by The Dow Chemical Company): 0.4 parts by mass Aqueous Layer 2

Ion-exchanged water: 40 parts by mass

Anionic surfactant (Dowfax, manufactured by The Dow Chemical Company): 0.05 parts by mass Ammonium peroxodisulfate (manufactured by FUJIFILM Wako Pure Chemical Corporation): 0.4 parts by mass The above-described oil-layer components and Aqueous-layer-1 components are placed into a flask and mixed by stirring to provide a monomer emulsion-dispersion liquid. Into a reaction vessel, the above-described Aqueous-layer-2 components are placed; the vessel is sufficiently purged with nitrogen, and heated under stirring in an oil bath until the internal temperature of the reaction system reaches 75° C. Into the reaction vessel, the above-described monomer emulsion-dispersion liquid is gradually added dropwise over 3 hours to cause emulsion polymerization. After the dropwise addition is complete, polymerization at 75° C. is further continued, and the polymerization is completed after the lapse of 3 hours.

For the resultant resin particles, a laser diffraction particle size distribution analyzer LA-700 (manufactured by HORIBA, Ltd.) is used for measurement and, as a result, the volume-average particle size D50v of the resin particles is found to be 250 nm; a differential scanning calorimeter (DSC-50, manufactured by SHIMADZU CORPORATION) is used for measurement and, as a result, the glass transition temperature of the resin at a heating rate of 10° C./min is found to be 53° C.; and a molecular weight measurement device (HLC-8020, manufactured by Tosoh Corporation) is used for measurement and, as a result, the number-average molecular weight (polystyrene equivalent) using THF as the solvent is found to be 13,000. Thus, the obtained resin-particle dispersion liquid has a volume-average particle size of 250 nm, a solid content of 42%, a glass transition temperature of 52° C., and a number-average molecular weight Mn of 13,000.

Preparation of Toner 1

Resin-particle dispersion liquid: 150 parts by mass

Coloring-material-particle dispersion liquid: 30 parts by mass

Release-agent-particle dispersion liquid: 40 parts by mass

Polyaluminum chloride: 0.4 parts by mass

The above-described components are sufficiently mixed and dispersed in a stainless steel flask using an ULTRA-TURRAX manufactured by IKA-Werke GmbH & Co. KG, and subsequently heated to 48° C. in a heating oil bath under stirring of the flask. After the flask is held at 48° C. for 80 minutes, into the flask, 50 parts by mass of the same resin-particle dispersion liquid as above and 20 parts by mass of the release-agent-particle dispersion liquid are gently added.

Subsequently, an aqueous sodium hydroxide solution having a concentration of 0.5 mol/L is used to adjust the pH of the system to 6.0; subsequently, the stainless steel flask is sealed; the sealing of the stirring shaft is magnetically sealed and the flask, under stirring, is heated to 97° C. and held for 3 hours. After the reaction is completed, the content is cooled at a cooling rate of 1° C./min, filtered, sufficiently washed with ion-exchanged water, and subsequently subjected to solid-liquid separation by Nutsche suction filtration. The resultant solid is further dispersed again in 3,000 parts by mass of ion-exchanged water at 40° C., and stirred and washed for 15 minutes at 300 rpm. This washing procedure is further repeated 5 times; at the time when the filtrate has a pH of 6.54 and an electric conductivity of 6.5 μS/cm, Nutsche suction filtration is performed using No. 5A filter paper to achieve solid-liquid separation. Subsequently, vacuum drying is performed over 12 hours to obtain toner base particles.

The toner base particles are measured using a Coulter counter and the volume-average particle size D50v is found to be 6.2 μm, and the volume-average particle size distribution index GSDv is found to be 1.20. The shape of the particles is observed using a LUZEX image analyzer manufactured by NIRECO CORPORATION, and the particles are found to have a shape factor SF1 of 135 and have potato shapes. The glass transition temperature of the toner is found to be 52° C. Furthermore, to this toner, silica ($SiO_2$) particles having surfaces having been subjected to hydrophobizing treatment using hexamethyldisilazane (hereafter, may be abbreviated as "HMDS") and having an average primary particle size of 40 nm and metatitanic acid compound particles being a reaction product of metatitanic acid and isobutyltrimethoxysilane and having an average primary particle size of 20 nm are added such that the coverage of the surfaces of the toner particles becomes 40%, and mixed using a Henschel mixer, to prepare Toner 1.

Preparation of Toners 2 to 5

Toner 2 to Toner 5 are prepared as with Toner 1 except that the amount of resin-particle dispersion liquid and the amount of release-agent-particle dispersion liquid added after holding at 48° C. for 80 minutes are changed as described below.

Toner 2: 45 parts by mass of resin-particle dispersion liquid, and 25 parts by mass of release-agent-particle dispersion liquid Toner 3: 55 parts by mass of resin-particle dispersion liquid, and 15 parts by mass of release-agent-particle dispersion liquid Toner 4: 60 parts by mass of resin-particle dispersion liquid, and 10 parts by mass of release-agent-particle dispersion liquid Toner 5: 35 parts by mass of resin-particle dispersion liquid, and 35 parts by mass of release-agent-particle dispersion liquid Preparation of Toner 6

A polyester resin powder (850 parts) provided by drying the resin-particle dispersion liquid used for the preparation of Toner 1, 75 parts of a cyan pigment (copper phthalocyanine, C.I. Pigment Blue 15:3, manufactured by Dainichiseika Color & Chemicals Mfg. Co., Ltd.), and 80 parts of paraffin wax: HNP-9 (manufactured by NIPPON SEIRO CO., LTD.) are sufficiently mixed by stirring in a 5 L Henschel mixer (manufactured by Mitsui Miike Chemical Engineering Machinery, Co., Ltd.), and melt-kneaded in a TEM 18 screw extruder (manufactured by Toshiba Machine Co., Ltd.); the resultant kneaded product is rolled and cooled, subsequently pulverized in a fluidized-bed mill AFG200 (manufactured by Hosokawa Micron Corporation), and subsequently classified in an inertia classifier ELB3 (manufactured by MATSUBO Corporation) to prepare Toner 6.

Preparation of Magnetic Particles 1

$Fe_2O_3$(1,318 parts by mass), 586 parts by mass of $Mn(OH)_2$, 96 parts by mass of $Mg(OH)_2$, and 1 part by mass of $SrCO_3$ are mixed together, and, together with a dispersing agent, water, and zirconia beads having a media diameter of 1 mm, mixed by disintegration in a sand mill. The zirconia beads are removed by filtration; the resultant substance is dried and then treated in a rotary kiln at 20 rpm at 900° C. to provide mixed oxide. Subsequently, to this, a dispersing agent and water are added, and further 6.6 parts by mass of polyvinyl alcohol is added; the resultant substance is pulverized in a wet ball mill until the volume-average particle size reaches 1.2 μm. Subsequently, a spray dryer is used to form and dry particles such that the dry particle size becomes 32 μm. Furthermore, the particles are baked in an electric furnace at 1220° C. in an oxygen-nitrogen mixture atmosphere having an oxygen concentration of 1% for 5 hours. The resultant particles are subjected to a disintegration step and a classification step, subsequently heated in a rotary kiln at 15 rpm at 900° C. for 2 hours, and are similarly subjected to a classification step to obtain Magnetic particles 1. For Magnetic particles 1, the volume-average particle size is found to be 30 μm and the BET specific surface area is found to be 0.20 $m^2/g$.

Preparation of Inorganic Particles Internally Added to Carrier Resin Cover Layers Inorganic Particles 1

Commercially available hydrophilic silica particles (fumed silica particles, no surface treatment, volume-average particle size: 40 nm) are prepared as Inorganic particles 1.

Inorganic particles 2

Into a glass reaction vessel equipped with a stirrer, a dropping nozzle, and a thermometer, 890 parts of methanol and 210 parts of 9.8% ammonia water are placed and mixed, to obtain an alkali catalyst solution. The alkali catalyst solution is adjusted to 45° C. and subsequently, under stirring, 550 parts of tetramethoxysilane and 140 parts of 7.6% ammonia water are simultaneously added dropwise over 450 minutes, to obtain Silica-particle dispersion liquid (A). For the silica particles in Silica-particle dispersion liquid (A), the volume-average particle size is found to be 4 nm, and the volume-average particle size distribution index $((D84v/D16v)^{1/2}$, the square root of a ratio of, in the volume-based particle size distribution, a particle size D84v corresponding to a cumulative value of 84% in a curve drawn from the smaller to larger particle sizes to a particle size D16v corresponding to a cumulative value of 16%) is found to be 1.2.

Silica-particle dispersion liquid (A) (300 parts) is placed into an autoclave equipped with a stirrer, and the stirrer is rotated at 100 rpm. Under the rotation of the stirrer, liquid carbon dioxide is injected, from a carbon dioxide cylinder, via a pump, into the autoclave; while the internal temperature of the autoclave is increased using a heater, the internal pressure is increased using a pump to bring the internal environment of the autoclave to a supercritical state at 150° C. and at 15 MPa. While the pressure valve is adjusted to keep the internal pressure of the autoclave at 15 MPa, supercritical carbon dioxide is passed, to remove methanol and water from Silica-particle dispersion liquid (A). At the time when the amount of carbon dioxide supplied into the autoclave reaches 900 parts, supply of carbon dioxide is stopped and powder of silica particles is obtained.

While the heater and the pump are used to keep the internal environment of the autoclave at 150° C. and at 15 MPa to maintain the supercritical state of carbon dioxide, under rotation of the stirrer of the autoclave, 50 parts of hexamethyldisilazane relative to 100 parts of silica particles is injected, using an entrainer pump, into the autoclave, and the internal temperature of the autoclave is increased to 180° C. to cause a reaction for 20 minutes. Subsequently, supercritical carbon dioxide is passed again through the autoclave, to remove an excess of hexamethyldisilazane. Subsequently, stirring is stopped, and the pressure valve is opened until the internal pressure of the autoclave reaches the atmospheric pressure and the internal temperature decreases to room temperature (25° C.). In this way, Inorganic particles 2 having surfaces having been treated with hexamethyldisilazane are obtained. Inorganic particles 2 are found to have a volume-average particle size of 4 nm.

Inorganic Particles 3

As in the preparation of Inorganic particles 2, Inorganic particles 3 having surfaces having been treated with hexamethyldisilazane are obtained except that, during the preparation of Silica-particle dispersion liquid (A), the amounts of tetramethoxysilane and 7.6% ammonia water added dropwise are increased and the volume-average particle size of silica particles in the silica particle dispersion liquid is changed to 6 nm. Inorganic particles 3 are found to have a volume-average particle size of 7 nm.

Inorganic Particles 4

Commercially available hydrophobic silica particles (fumed silica particles having surfaces having been treated with hexamethyldisilazane, volume-average particle size: 12 nm) are prepared as Inorganic particles 4.

Inorganic Particles 5

Commercially available hydrophilic silica particles (fumed silica particles, no surface treatment, volume-average particle size: 62 nm) are prepared as Inorganic particles 5.

Inorganic Particles 6

Commercially available hydrophobic silica particles (fumed silica particles having surfaces having been treated with hexamethyldisilazane, volume-average particle size: 88 nm) are prepared as Inorganic particles 6.

Inorganic Particles 7

Commercially available hydrophobic silica particles (fumed silica particles having surfaces having been treated with hexamethyldisilazane, volume-average particle size: 93 nm) are prepared as Inorganic particles 7.

Inorganic Particles 8

Commercially available calcium carbonate particles (volume-average particle size: 20 nm) are prepared as Inorganic particles 8.

Inorganic Particles 9

Commercially available barium carbonate particles (volume-average particle size: 20 nm) are prepared as Inorganic particles 9.

Inorganic Particles 10

Commercially available barium sulfate particles (volume-average particle size: 30 nm) are prepared as Inorganic particles 10.

Preparation of Coating Agent for Forming Carrier Resin Cover Layers

Coating Agent (1)

- Perfluoropropylethyl methacrylate-methyl methacrylate copolymer (mass-based polymerization ratio=30:70, weight-average molecular weight: 19,000): 7.5 parts
- Polycyclohexyl methacrylate (weight-average molecular weight: 200,000): 9 parts
- Carbon black (manufactured by Cabot Corporation, VXC72): 0.5 parts
- Inorganic particles 1: 20 parts
- Toluene: 250 parts
- Isopropyl alcohol: 50 parts The above-described materials and glass beads (diameter: 1 mm, the same amount as in toluene) are placed into a sand mill, and stirred at 190 rpm for 30 minutes, to obtain Coating agent (1) having a solid content of 11%.

Coating Agents (2) to (7)

Coating agents (2) to (7) are each obtained as in the preparation of Coating agent (1) except that Inorganic particles 1 are replaced by any one of Inorganic particles 2 to 7.

Coating Agents (8) to (11)

Coating agents (8) to (11) are each obtained as in the preparation of Coating agent (1) except that the amount of Inorganic particles 1 added is changed as described below.

- Coating agent (8): 10 parts of Inorganic particles 1
- Coating agent (9): 12 parts of Inorganic particles 1
- Coating agent (10): 30 parts of Inorganic particles 1
- Coating agent (11): 40 parts of Inorganic particles 1

Coating Agents (12) to (14)

Coating agents (12) to (14) are each obtained as in the preparation of Coating agent (1) except that Inorganic particles 1 are replaced by any one of Inorganic particles 8 to 10.

Coating Agents (15) to (17)

Coating agents (15) to (17) are each obtained as in the preparation of Coating agent (1) except that the amounts of perfluoropropylethyl methacrylate-methyl methacrylate copolymer and polycyclohexyl methacrylate added are changed as described below.

- Coating agent (15): 11 parts of perfluoropropylethyl methacrylate-methyl methacrylate copolymer, and 5 parts of polycyclohexyl methacrylate
- Coating agent (16): 6 parts of perfluoropropylethyl methacrylate-methyl methacrylate copolymer, and 14 parts of polycyclohexyl methacrylate Coating agent (17): 1.5 parts of perfluoropropylethyl methacrylate-methyl methacrylate copolymer, and 19 parts of polycyclohexyl methacrylate

Examples 1 to 30 and Comparative Examples 1 to 6

Preparation of Resin-Covered Carriers

Preparation of Carrier 1

Magnetic particles (1,000 parts) and 125 parts of Coating agent (1) are placed into a kneader, and mixed at room temperature (25° C.) for 20 minutes. Subsequently, the content is heated to 70° C. under a reduced pressure, to thereby be dried.

The dry content is cooled to room temperature (25° C.); 125 parts of Coating agent (1) is additionally added, and the content is mixed at room temperature (25° C.) for 20 minutes. Subsequently, the content is heated to 70° C. under a reduced pressure, to thereby be dried.

Subsequently, the dry content is taken out of the kneader, and sifted through a mesh having openings of 75 μm to remove coarse particles, to obtain Carrier 1.

Preparation of Carriers 2 to 31

Carriers 2 to 31 are each obtained as in the preparation of Carrier 1 except that, as described in Tables 1-2 and 1-4, the type and amounts of Coating agent and the time for mixing are changed.

Preparation of Developers

A carrier in Table 1-1 or 1-3 and a toner in Table 1-1 or 1-3 are placed into a V blender in a mixing ratio (mass ratio) of carrier:toner=100:10 and stirred for 20 minutes. In this way, Developers 1 to 26 are each obtained.

Release-Agent Exposure Ratio

The release-agent exposure ratio is measured by XPS (X-ray photoelectron spectroscopy). Specifically, as the XPS measurement apparatus, JPS-9000MX manufactured by JEOL Ltd. is used; the measurement is performed using, as the X-ray source, MgKα radiation, at an acceleration voltage of 10 kV, and at an emission current of 30 mA. For the C1s spectrum, the peak separation method is performed to determine the amount of release agent at the surfaces of the toner. In the peak separation method, the measured C1s spectrum is separated into components by curve fitting using the method of least squares. Of the separated peaks, the area of a peak derived from the release agent and the composition ratio are used to calculate the exposure ratio. As the component spectra serving as the bases for separation, C1s spectra obtained by measuring individually the release agent and the binder resin used for preparation of the toner particles are used.

When the toner particles to be measured are an external-additive-containing toner, they are subjected to, together with a mixing solution of ion-exchanged water and a surfactant, ultrasonic wave treatment for 20 minutes to remove the external additive; the surfactant is removed, and the toner particles are dried, collected, and subsequently measured. Note that the process of removing the external additive may be repeatedly performed until removal of the external additive is achieved.

Measurement of Average Particle Size of Inorganic Particles in Resin Cover Layers Such a carrier is embedded in an epoxy resin and a microtome is used for cutting to form a carrier section. The carrier section is photographed using a scanning electron microscope (manufactured by Hitachi, Ltd., S-4100); the resultant SEM image is imported into an image processing analyzer (manufactured by NIRECO CORPORATION, LUZEX AP) and subjected to image analysis. In the resin cover layers, 100 inorganic particles (primary particles) are randomly selected, and the equivalent circular diameters (nm) of the particles are determined and arithmetically averaged to determine the average particle size (nm) of the inorganic particles.

Measurement of Average Thickness of Resin Cover Layers

The above-described SEM image is imported into an image processing analyzer (manufactured by NIRECO CORPORATION, LUZEX AP) and subjected to image analysis. The thicknesses (μm) of the resin cover layer at randomly selected 10 positions of a particle of the carrier are measured; this measurement is further performed for 100 particles of the carrier; all the measured thicknesses are arithmetically averaged to determine the average thickness (μm) of the resin cover layers.

Surface Analysis of Carrier

As an apparatus for three-dimensionally analyzing the surfaces of the carriers, a surface roughness analysis 3D scanning electron microscope ERA-8900FE manufactured by ELIONIX INC. is used. Specifically, surface analysis of such a carrier using ERA-8900FE is performed in the following manner.

The surface of a single particle of the carrier is magnified at ×5,000. Measurement points are defined such that 400 measurement points are arranged in the long-side direction and 300 measurement points are arranged in the short-side direction; three-dimensional measurement is performed to obtain three-dimensional image data of the region of 24 μm×18 μm. For the three-dimensional image data, a spline filter with a limit wavelength set at 12 μm is used to remove wavelengths of periods of 12 μm or more; furthermore, a Gaussian high-pass filter with a cutoff value set at 2.0 μm is used to remove wavelengths of periods of 2.0 μm or more. Thus, three-dimensional roughness profile data is obtained. From the three-dimensional roughness profile data, the surface area B ($\mu m^2$) of a central region of 12 μm×12 μm (plan-view area A=144 $\mu m^2$) is determined and the ratio B/A is determined. For 100 particles of the carrier, the ratios B/A are determined and arithmetically averaged.

Measurement of Silicon Element Concentration

The carrier serving as the sample is analyzed under the following conditions by X-ray photoelectron spectroscopy (XPS) to determine, on the basis of the peak intensities of elements, the silicon element concentration (atomic %).

XPS apparatus: manufactured by ULVAC-PHI, Inc., VersaProbe II

Etching gun: argon gun

Acceleration voltage: 5 kV

Emission current: 20 mA

Sputtering region: 2 mm×2 mm

Sputtering rate: 3 nm/min (in terms of $SiO_2$)

Sampling of Magnetic Particles from Developer

From such a developer, a 16 μm mesh is used to separate the carrier. For the separated carrier, for example, toluene is used to dissolve the coating layers to take out the magnetic particles. The solvent is appropriately changed in accordance with the coating resin. During the dissolution, depending on the solvent, heating or application of ultrasonic waves is performed, for example.

Volume-Average Particle Size of Magnetic Particles

The volume-average particle size of magnetic particles is measured using a laser diffraction particle size distribution analyzer LA-700 (manufactured by HORIBA, Ltd.).

Suppression of Change in Image Density

The density differences of the obtained developers are determined. The smaller such a density difference, the higher the suppression of change in density.

A modified DocuCenter Color 400 manufactured by Fuji Xerox Co., Ltd. is used in a low-temperature low-humidity environment at an interior temperature of 10° C. and at a relative humidity of 15% to print, on 50,000 A4-sized embossed paper sheets (Tokushu Tokai Paper Co., Ltd., Rezak 66), a test chart having an area coverage of 5%; for the difference in image density between the 1,000th paper sheet and the 50,000th paper sheet, a spectrocolorimeter (X-Rite Ci62, manufactured by X-Rite Inc.) is used to measure, at randomly selected three points in such an image, L*, a*, and b* values; a color difference ΔE is calculated by a formula below; the color difference ΔE is graded into one of the following grades and evaluated.

A: The color difference ΔE is 1 or less, which is not problematic at all.

B: The color difference ΔE is more than 1 and 2 or less. The color difference is small and not problematic at all.

C: The color difference ΔE is more than 2 and 3 or less. The density difference is present, but is allowable.

D: The color difference ΔE is more than 3 and 5 or less. The density difference is present, but is allowable.

E: The color difference ΔE is more than 5, which is problematic.

$$\Delta E=\sqrt{(L_1-L_2)^2+(a_1-a_2)^2+(b_1-b_2)^2}$$

TABLE 1-1

| | Type of toner | Release-agent exposure ratio (%) | Type of carrier | Arithmetic average particle size of inorganic particles (nm) | Type of inorganic particles | Average thickness of resin cover layers (μm) | Silicon element concentration at surfaces of carrier (atomic %) | B/A |
|---|---|---|---|---|---|---|---|---|
| Example 1 | 1 | 23 | 1 | 40 | 1 | 1.1 | 11.3 | 1.055 |
| Example 2 | 3 | 17 | 1 | 40 | 1 | 1.1 | 11.3 | 1.055 |
| Example 3 | 2 | 28 | 1 | 40 | 1 | 1.1 | 11.3 | 1.055 |
| Example 4 | 1 | 23 | 3 | 40 | 1 | 1.1 | 11.0 | 1.021 |
| Example 5 | 1 | 23 | 4 | 40 | 1 | 1.1 | 10.9 | 1.047 |
| Example 6 | 1 | 23 | 5 | 40 | 1 | 1.1 | 12.2 | 1.063 |
| Example 7 | 1 | 23 | 6 | 40 | 1 | 1.1 | 14.2 | 1.097 |
| Example 8 | 1 | 23 | 8 | 4 | 2 | 0.9 | 11.2 | 1.070 |
| Example 9 | 1 | 23 | 9 | 7 | 3 | 0.7 | 10.5 | 1.059 |
| Example 10 | 1 | 23 | 10 | 12 | 4 | 1.0 | 13.1 | 1.075 |
| Example 11 | 1 | 23 | 11 | 62 | 5 | 1.1 | 12.5 | 1.044 |
| Example 12 | 1 | 23 | 12 | 88 | 6 | 0.9 | 11.7 | 1.068 |
| Example 13 | 1 | 23 | 13 | 93 | 7 | 1.2 | 11.9 | 1.051 |
| Example 14 | 1 | 23 | 14 | 40 | 1 | 0.5 | 12.3 | 1.061 |
| Example 15 | 1 | 23 | 15 | 40 | 1 | 0.6 | 10.6 | 1.048 |
| Example 16 | 1 | 23 | 16 | 40 | 1 | 0.9 | 10.9 | 1.041 |
| Example 17 | 1 | 23 | 17 | 40 | 1 | 1.2 | 11.8 | 1.058 |
| Example 18 | 1 | 23 | 18 | 40 | 1 | 1.3 | 10.1 | 1.049 |

TABLE 1-2

| | Coating agent | | | | | | Evaluation of |
|---|---|---|---|---|---|---|---|
| | Type | Amount of PFEM/MM added (parts by mass) | Mw of CHM ($\times 10^4$) | Amount of CHM added (parts by mass) | Amount of additional addition (parts by mass) | Time for mixing (min) | suppression of change in image density |
| Example 1 | (1) | 7.5 | 20.0 | 9 | 135 | 23 | A |
| Example 2 | (1) | 7.5 | 20.0 | 9 | 135 | 23 | C |
| Example 3 | (1) | 7.5 | 20.0 | 9 | 135 | 23 | B |
| Example 4 | (1) | 7.5 | 20.0 | 9 | 135 | 38 | C |

TABLE 1-2-continued

| | Coating agent: Type | Amount of PFEM/MM added (parts by mass) | Mw of CHM ($\times10^4$) | Amount of CHM added (parts by mass) | Amount of additional addition (parts by mass) | Time for mixing (min) | Evaluation of suppression of change in image density |
|---|---|---|---|---|---|---|---|
| Example 5 | (1) | 7.5 | 20.0 | 9 | 135 | 28 | B |
| Example 6 | (1) | 7.5 | 20.0 | 9 | 135 | 20 | B |
| Example 7 | (1) | 7.5 | 20.0 | 9 | 135 | 10 | C |
| Example 8 | (2) | 7.5 | 20.0 | 9 | 135 | 23 | D |
| Example 9 | (3) | 7.5 | 20.0 | 9 | 135 | 23 | C |
| Example 10 | (4) | 7.5 | 20.0 | 9 | 135 | 23 | C |
| Example 11 | (5) | 7.5 | 20.0 | 9 | 135 | 23 | B |
| Example 12 | (6) | 7.5 | 20.0 | 9 | 135 | 23 | C |
| Example 13 | (7) | 7.5 | 20.0 | 9 | 135 | 23 | D |
| Example 14 | (1) | 7.5 | 20.0 | 9 | 100 | 23 | D |
| Example 15 | (1) | 7.5 | 20.0 | 9 | 105 | 23 | C |
| Example 16 | (1) | 7.5 | 20.0 | 9 | 125 | 23 | B |
| Example 17 | (1) | 7.5 | 20.0 | 9 | 138 | 23 | B |
| Example 18 | (1) | 7.5 | 20.0 | 9 | 143 | 23 | C |

TABLE 1-3

| | Type of toner | Release-agent exposure ratio (%) | Type of carrier | Arithmetic average particle size of inorganic particles (nm) | Type of inorganic particles | Average thickness of resin cover layers (μm) | Silicon element concentration at surfaces of carrier (atomic %) | B/A |
|---|---|---|---|---|---|---|---|---|
| Example 19 | 1 | 23 | 19 | 40 | 1 | 1.6 | 12.7 | 1.047 |
| Example 20 | 1 | 23 | 20 | 20 | 8 | 1.1 | Not measured | 1.058 |
| Example 21 | 1 | 23 | 21 | 20 | 9 | 1.2 | Not measured | 1.061 |
| Example 22 | 1 | 23 | 30 | 30 | 10 | 1.1 | Not measured | 1.055 |
| Example 23 | 1 | 23 | 22 | 40 | 1 | 1.1 | 4.9 | 1.048 |
| Example 24 | 1 | 23 | 23 | 40 | 1 | 1.0 | 6.3 | 1.055 |
| Example 25 | 1 | 23 | 24 | 40 | 1 | 1.0 | 17.9 | 1.067 |
| Example 26 | 1 | 23 | 25 | 40 | 1 | 1.1 | 21.6 | 1.049 |
| Example 27 | 1 | 23 | 26 | 40 | 1 | 1.1 | 10.1 | 1.060 |
| Example 28 | 1 | 23 | 27 | 40 | 1 | 1.0 | 10.5 | 1.045 |
| Example 29 | 1 | 23 | 29 | 40 | 1 | 1.1 | 11.1 | 1.066 |
| Example 30 | 6 | 23 | 1 | 40 | 1 | 1.1 | 11.3 | 1.055 |
| Comparative Example 1 | 4 | 11 | 30 | 4 | 2 | 0.5 | 4.8 | 1.018 |
| Comparative Example 2 | 5 | 33 | 31 | 93 | 7 | 1.6 | 22.0 | 1.110 |
| Comparative Example 3 | 4 | 11 | 1 | 40 | 1 | 1.1 | 11.3 | 1.055 |
| Comparative Example 4 | 5 | 33 | 1 | 40 | 1 | 1.1 | 11.3 | 1.055 |
| Comparative Example 5 | 1 | 23 | 2 | 40 | 1 | 1.1 | 9.7 | 1.019 |
| Comparative Example 6 | 1 | 23 | 7 | 40 | 1 | 1.1 | 13.8 | 1.104 |

TABLE 1-4

| | Coating agent: Type | Amount of PFEM/MM added (parts by mass) | Mw of CHM ($\times10^4$) | Amount of CHM added (parts by mass) | Amount of additional addition (parts by mass) | Time for mixing (min) | Evaluation of suppression of change in image density |
|---|---|---|---|---|---|---|---|
| Example 19 | (1) | 7.5 | 20.0 | 9 | 155 | 23 | D |
| Example 20 | (12) | 7.5 | 20.0 | 9 | 135 | 23 | B |
| Example 21 | (13) | 7.5 | 20.0 | 9 | 135 | 23 | B |
| Example 22 | (14) | 7.5 | 20.0 | 9 | 135 | 23 | B |
| Example 23 | (8) | 7.5 | 20.0 | 9 | 135 | 23 | D |
| Example 24 | (9) | 7.5 | 20.0 | 9 | 135 | 23 | C |
| Example 25 | (10) | 7.5 | 20.0 | 9 | 135 | 23 | C |

TABLE 1-4-continued

| | Coating agent | | | | | | Evaluation of suppression |
|---|---|---|---|---|---|---|---|
| | Type | Amount of PFEM/MM added (parts by mass) | Mw of CHM ($\times 10^4$) | Amount of CHM added (parts by mass) | Amount of additional addition (parts by mass) | Time for mixing (min) | of change in image density |
| Example 26 | (11) | 7.5 | 20.0 | 9 | 135 | 23 | D |
| Example 27 | (15) | 11 | 12.2 | 5 | 135 | 23 | B |
| Example 28 | (16) | 6 | 25.1 | 14 | 135 | 23 | B |
| Example 29 | (17) | 1.5 | 32.6 | 19 | 135 | 23 | D |
| Example 30 | (1) | 7.5 | 20.0 | 9 | 135 | 23 | A |
| Comparative Example 1 | (1) | 7.5 | 20.0 | 9 | 100 | 80 | E |
| Comparative Example 2 | (1) | 7.5 | 20.0 | 9 | 155 | 3 | E |
| Comparative Example 3 | (1) | 7.5 | 20.0 | 9 | 135 | 23 | E |
| Comparative Example 4 | (1) | 7.5 | 20.0 | 9 | 135 | 23 | E |
| Comparative Example 5 | (1) | 7.5 | 20.0 | 9 | 135 | 40 | E |
| Comparative Example 6 | (1) | 7.5 | 20.0 | 9 | 135 | 6 | E |

Note that the abbreviations in Tables 1-2 and 1-4 are as follows.

PFEM/MM: perfluoropropylethyl methacrylate/methyl methacrylate copolymer (mass-based polymerization ratio=30:70, weight-average molecular weight Mw=19,000)

CHM: polycyclohexyl methacrylate (having a weight-average molecular weight Mw described in Tables 1-2 and 1-4)

The above-described results have demonstrated the following: compared with Comparative Examples, Examples are excellent in suppression of change in density even in the cases of performing continuous printing in a small image amount and subsequently performing printing at high image density.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrostatic image developer comprising:

a toner including toner particles that include a binder resin and a release agent and have an exposure ratio of the release agent of 15% or more and 30% or less; and a carrier including magnetic particles and resin cover layers covering the magnetic particles and including inorganic particles, wherein the inorganic particles have an arithmetic average particle size of 5 nm or more and 90 nm or less, the resin cover layers have an average thickness of 0.6 μm or more and 1.4 μm or less, and a fine-irregularity-structure surface roughness of surfaces of the carrier three-dimensionally analyzed has, in an analysis region, a ratio B/A of an irregularity-surface area B to a plan-view area A of 1.020 or more and 1.100 or less.

2. The electrostatic image developer according to claim 1, wherein the ratio B/A is 1.040 or more and 1.080 or less.

3. The electrostatic image developer according to claim 1, wherein the inorganic particles have an arithmetic average particle size of 5 nm or more and 70 nm or less.

4. The electrostatic image developer according to claim 2, wherein the inorganic particles have an arithmetic average particle size of 5 nm or more and 70 nm or less.

5. The electrostatic image developer according to claim 1, wherein the resin cover layers have an average thickness of 0.8 μm or more and 1.2 μm or less.

6. The electrostatic image developer according to claim 2, wherein the resin cover layers have an average thickness of 0.8 μm or more and 1.2 μm or less.

7. The electrostatic image developer according to claim 3, wherein the resin cover layers have an average thickness of 0.8 μm or more and 1.2 μm or less.

8. The electrostatic image developer according to claim 4, wherein the resin cover layers have an average thickness of 0.8 μm or more and 1.2 μm or less.

9. The electrostatic image developer according to claim 1, wherein the toner includes an external additive, and the inorganic particles have the same charging polarity as in the external additive.

10. The electrostatic image developer according to claim 2, wherein the toner includes an external additive, and the inorganic particles have the same charging polarity as in the external additive.

11. The electrostatic image developer according to claim 1, wherein the inorganic particles are inorganic oxide particles.

12. The electrostatic image developer according to claim 1, wherein the inorganic particles are silica particles, and the surfaces of the carrier have a silicon element concentration measured by X-ray photoelectron spectroscopy of more than 2 atomic % and less than 20 atomic %.

13. The electrostatic image developer according to claim 12, wherein the silicon element concentration is more than 5 atomic % and less than 20 atomic %.

14. The electrostatic image developer according to claim 1, wherein a content of the inorganic particles relative to a total mass of the resin cover layers is 10 mass % or more and 60 mass % or less.

15. The electrostatic image developer according to claim 1, wherein the resin cover layers include a resin having a weight-average molecular weight of less than 300,000.

16. The electrostatic image developer according to claim 15, wherein the resin included in the resin cover layers has a weight-average molecular weight of less than 250,000.

17. The electrostatic image developer according to claim 1, wherein the magnetic particles have a roughness profile having an arithmetic average height Ra of 0.3 μm or more and 1.2 μm or less.

18. A process cartridge comprising a developing section housing the electrostatic image developer according to claim 1 and configured to develop, using the electrostatic image developer, an electrostatic image formed on a surface of an image holding member, to form a toner image, wherein the process cartridge is attachable to and detachable from an image forming apparatus.

19. An image forming apparatus used with the electrostatic image developer according to claim 1, the image forming apparatus comprising:

an image holding member;

a charging section configured to charge a surface of the image holding member;

an electrostatic image forming section configured to form, on the charged surface of the image holding member, an electrostatic image;

a developing section housing the electrostatic image developer and configured to develop, using the electrostatic image developer, the electrostatic image formed on the surface of the image holding member, to form a toner image;

a transfer section configured to transfer the toner image formed on the surface of the image holding member onto a surface of a recording medium; and a fixing section configured to fix the transferred toner image on the surface of the recording medium.

20. An image forming method comprising:

charging a surface of an image holding member;

forming an electrostatic image on the charged surface of the image holding member;

developing, using the electrostatic image developer according to claim 1, the electrostatic image formed on the surface of the image holding member, to form a toner image;

transferring the toner image formed on the surface of the image holding member onto a surface of a recording medium; and fixing the transferred toner image on the surface of the recording medium.

* * * * *